(12) United States Patent
Fukumitsu et al.

(10) Patent No.: US 7,177,955 B2
(45) Date of Patent: *Feb. 13, 2007

(54) DATA TRANSFERRING APPARATUS FOR TRANSFERRING LIQUID EJECTION DATA AND A LIQUID EJECTING APPARATUS INCLUDING A HEADER ANALYZING UNIT THAT ANALYZES A HEADER OF LIQUID EJECTION CONTROLLING DATA

(75) Inventors: Yasunori Fukumitsu, Nagano-ken (JP); Masahiro Kimura, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 430 days.

This patent is subject to a terminal disclaimer.

(21) Appl. No.: 10/649,231

(22) Filed: Aug. 26, 2003

(65) Prior Publication Data

US 2004/0255060 A1    Dec. 16, 2004

(30) Foreign Application Priority Data

Jun. 16, 2003  (JP)  ............................. 2003-170962
Jun. 16, 2003  (JP)  ............................. 2003-171091

(51) Int. Cl.
    *G06F 13/00* (2006.01)
(52) U.S. Cl. ............................... 710/5; 710/62; 710/72
(58) Field of Classification Search .................. 710/22, 710/27, 33, 52, 53, 100, 104; 358/1; 345/305
See application file for complete search history.

(56) References Cited

U.S. PATENT DOCUMENTS 4,918,624 A    4/1990   Moore et al.
5,511,151 A *  4/1996   Russell et al. ............. 358/1.15
5,634,090 A    5/1997   Narukawa et al.
5,774,638 A    6/1998   Kageyama et al.
6,304,335 B1 * 10/2001  Furuya et al. ............. 358/1.15
6,388,760 B2 *  5/2002  Kadota et al. ............. 358/1.14

(Continued)

FOREIGN PATENT DOCUMENTS

CN    2655534 Y    11/2004

(Continued)

OTHER PUBLICATIONS

FreeBSD', FreeBsD Developers' Handbook', 1995., Chapter 9 DMA; hhp://-.freebsd.org/doc/en-us.lso88sg-☐☐l/books/developers-handbooidma.html.*

(Continued)

*Primary Examiner*—Kim Huynh
*Assistant Examiner*—Aurangzeb Hassan
(74) *Attorney, Agent, or Firm*—John J. Penny, Jr.; Edwards Angell Palmer & Dodge LLP

(57) ABSTRACT

Record controlling data received by an interface unit is transferred to a change controlling block, and transferred to a head analyzing block so that analysis of its head can be performed. In case the data following the head is a command, it is stored in a command storing register, and in case of compressed recording data, it is transferred to a data transfer controlling block. A MPU accesses the command storing register to analyze the command. The compressed recording data is stored in a FIFO memory via a first dedicated bus from the data transfer controlling block, and transferred to a DECU via a second dedicated bus.

20 Claims, 12 Drawing Sheets

U.S. PATENT DOCUMENTS 6,665,008 B1 * 12/2003 Silverbrook ............... 348/239
6,665,088 B1 * 12/2003 Chiba et al. ............... 358/1.17
6,687,022 B1 * 2/2004 Lapstun et al. ............ 358/1.9
6,819,443 B1 * 11/2004 Shima et al. .............. 358/1.15

FOREIGN PATENT DOCUMENTS

| EP | 1 079 326 A2 | 2/2001 |
|---|---|---|
| EP | 0 802 503 B1 | 9/2004 |
| JP | 3251053 | 11/2001 |

OTHER PUBLICATIONS

Copy of European Search Report issued Jan. 31, 2006.

* cited by examiner

INKJET TYPE RECORDING APPARATUS

OPERATION CONDITION
MAIN MEMORY SIDE : STARTING ADDRESS OF RUN LENGTH DATA IS AN EVEN ADDRESS
LOCAL MEMORY SIDE : STARTING ADDRESS OF IMAGE DATA IS AN EVEN ADDRESS
NUMBER OF BYTES IN 1 LINE : 16 BYTES

FIG. 10

DECU

| TRANSFER S13 | 12 13 | | | | | | | | | |
|---|---|---|---|---|---|---|---|---|---|---|
| FACE A | 20 20 | 20 20 | 12 13 | | | | | | | |
| FACE B | | | | | | | | | | |
| TRANSFER S14 | 14 15 | | | | | | | | | |
| FACE A | 20 20 | 20 20 | 12 13 | 14 15 | | | | | | |
| FACE B | | | | | | | | | | |
| TRANSFER S15 | 16 17 | | | | | | | | | |
| FACE A | 20 20 | 20 20 | 12 13 | 14 15 | 16 17 | | | | | |
| FACE B | | | | | | | | | | |
| TRANSFER S16 | 18 19 | | | | | | | | | |
| FACE A | 20 20 | 20 20 | 12 13 | 14 15 | 16 17 | 18 19 | | | | |
| FACE B | | | | | | | | | | |
| TRANSFER S17 | 20 FD | | | | | | | | | |
| FACE A | 20 20 | 20 20 | 12 13 | 14 15 | 16 17 | 18 19 | 20 | | | |
| FACE B | | | | | | | | | | |
| TRANSFER S18 | 11 02 | | | | | | | | | TRANSFER D3 |
| FACE A | 20 20 | 20 20 | 12 13 | 14 15 | 16 17 | 18 19 | 20 11 | 11 11 | |  |
| FACE B | 11 | | | | | | | | | |
| TRANSFER S19 | 98 B0 | | | | | | | | | |
| FACE A | | | | | | | | | | |
| FACE B | 11 98 | B0 | | | | | | | | |
| TRANSFER S20 | F2 FC | | | | | | | | | |
| FACE A | | | | | | | | | | |
| FACE B | 11 98 | B0 F2 | | | | | | | | |
| TRANSFER S21 | AB 03 | | | | | | | | | |
| FACE A | | | | | | | | | | |
| FACE B | 11 98 | B0 F2 | AB AB | AB AB | AB | | | | | |
| TRANSFER S22 | FF FE | | | | | | | | | |
| FACE A | | | | | | | | | | |
| FACE B | 11 98 | B0 F2 | AB AB | AB AB | AB FF | FE | | | | |
| TRANSFER S23 | FC FD | | | | | | | | | |
| FACE A | | | | | | | | | | |
| FACE B | 11 98 | B0 F2 | AB AB | AB AB | AB FF | FE FC | FD | | | |
| TRANSFER S24 | FE FF | | | | | | | | | TRANSFER D4 |
| FACE A | | | | | | | | | |  |
| FACE B | 11 98 | B0 F2 | AB AB | AB AB | AB FF | FE FC | FD FF | FF FF | | |

SETTING CONDITION
NO VERTICAL LINE REARRANGEMENT
TOTAL NUMBER OF DEVELOPED BYTES : 64 BYTES(16 × 4)
NUMBER OF BYTES IN 1 LINE : 16BYTES
NUMBER OF DEVELOPED LINES : 4 LINES

LOCAL MEMORY

DATA TRANSFERRING APPARATUS FOR TRANSFERRING LIQUID EJECTION DATA AND A LIQUID EJECTING APPARATUS INCLUDING A HEADER ANALYZING UNIT THAT ANALYZES A HEADER OF LIQUID EJECTION CONTROLLING DATA

The present application claims priority from Japanese Patent Applications Nos. 2003-170962 filed on Jun. 16, 2003 and 2003-171091 filed on Jun. 16, 2003, the contents of which are incorporated herein by reference.

BACKGROUND OF THE INVENTION

1. Field of the Invention

The present invention relates to a data transferring apparatus for transferring liquid ejection data and a liquid ejecting apparatus of liquid ejection data for transferring the liquid ejection data to a liquid ejecting head, wherein the liquid ejection data is inputted into the liquid ejecting apparatus which ejects a liquid such as ink from the liquid ejecting head onto a medium to be ejected.

2. Description of the Related Art

A liquid ejecting apparatus called an inkjet type printer ink records image data by ejecting ink from a recording head onto recording papers. The inkjet type printer ejects ink droplets of plural colors from plural nozzle arrays which are provided at the head face of the recording head as developing image data, which has been compressed to be capable of being developed in line, to bitmap images in line and forming the developed bitmap images on the recording side of the recording papers. It forms images on the recording papers by ejecting ink droplets of plural colors to form plural ink dots. Further, the compressed data capable of being developed in line is, for example, the compressed data by the run length compression method which is generally widely known, capable of developing per byte unit sequentially.

This inkjet type recording apparatus generally includes a data transferring apparatus for receiving image data compressed to be capable of being developed in line inputted from an external apparatus such as a personal computer, developing (extracting) the inputted compressed data inline, performing data processes required for the developed bitmap images and then transferring the data to a register of the recording head. The generally conventional data transferring apparatus is configured, for example, as shown in FIG. 12.

The data transferring apparatus 10 has a system bus SB as a data transfer route. To the system bus SB a microprocessor (MPU) 11, a RAM 12 and a head controlling unit 13 are coupled so as to transfer data, and a recording head 62 is coupled to the head controlling unit 13. The compressed recording data transferred from an information processing apparatus such as a personal computer or a digital camera, which is not shown in drawings, is stored in the RAM 12 via the system bus SB.

The compressed recording data stored in a compressed data storing area of the RAM 12 is transferred to the microprocessor 11 via the system bus SB one byte each in order (a route represented by the symbol A), extracted by a program in accordance with an extraction sequence one byte each in order, then transferred to the RAM 12 via the system bus SB one byte each in order once more (a route represented by the symbol B) and then stored a desired bitmap image area of the RAM 12. When the developed data has been completely stored in the bitmap image area of the RAM 12, the developed data in the bitmap image area of the RAM 12 is transferred to a register (not shown in drawings) in the head controlling unit 13 via the system bus SB one byte each (a route represented by the symbol C) and ink is ejected from each of the nozzle arrays of the recording head 62 onto the recording papers based on these bitmap images.

In addition, as an example of the prior art to speed up the data transfer process, it is well-known that two independent buses, a system bus and a local bus, are provided and two bus controllers are provided between the system bus and the local bus. In regard to the data transferring apparatus, parallel processing is performed, that is, one bus controller accesses a main memory which is coupled to the system bus while the other bus controller accesses the local memory which is coupled to the local bus so that the data transfer process can be speeded up (For example, Japanese Patent No. 3251053).

In order to enhance the performance speed of liquid ejection in regard to the data transferring apparatus 10 of the conventional liquid ejecting apparatus configured as shown in FIG. 12, in other words, in order to further increase the recording speed in regard to the inkjet type recording apparatus, there are some obstacles as mentioned below.

First, since the compressed recording data is developed (extracted) by a program one byte each, it is impossible to process a great quantity of compressed data at high speed. If the microprocessor 11, which operates at high speed clock and has a high process capacity, is used, speeding up can be achieved, however, this causes such problems as the cost of the data transferring apparatus 10 gets extremely high if this expensive microprocessor 11 is mounted.

In addition, since both the data transfer to the RAM 12 and the data transfer from the RAM 12 are performed through the microprocessor 11, while the microprocessor 11 executes other data processes or calculations such as the microprocessor 11 fetches programs from the RAM 12, the data transfer might get into a waiting state, and thus the data transfer delay occurs, so that the data transfer at high speed can not be achieved.

Further, since the same route is used for both the access route from the microprocessor 11 to the RAM 12 via the system bus SB and the data transfer route from the RAM 12 to the recording head 62, the system bus SB is occupied while the microprocessor 11 accesses the RAM 12, so that the data transfer from the RAM 12 to the recording head 62 cannot be performed during that time. For this reason, the data transfer delay to the recording head 62 occurs, and thus the data transfer rate cannot be speeded up.

Further, in regard to the prior art disclosed in the Patent Document 1 described above, the compressed recording data is also developed (extracted) by a program one byte each, so that a great amount of compressed data cannot be developed at high speed. Therefore, in regard to the liquid ejecting apparatus such as the recording apparatus which executes recording by developing the compressed recording data transferred from an information processing apparatus and then transferring it to the recording head, the speed of ejecting liquid cannot be enhanced because the process to develop the compressed data is still slow though the data transfer process can be performed at high speed.

SUMMARY OF THE INVENTION

It is the first object of the present invention to realize the development process of compressed data at high speed and the data transfer to the liquid ejecting head at high speed so that it is possible to considerably increase the liquid ejection speed of the liquid ejecting apparatus compared with that of the prior art.

In addition, it is the second object of the present invention to significantly reduce a data transfer load of the system bus and a processing load of the microprocessor so that it is possible to further increase the liquid ejection speed of the liquid ejecting apparatus compared with that of the prior art.

To achieve the objects above, according to the first aspect of the present invention, a data transferring apparatus for transferring liquid ejection data, comprises a bus system, which comprises two independent bus systems of a system bus and a local bus a local memory coupled to the local bus in order to be able to transfer data to the local bus, an interface unit for receiving liquid ejection controlling data which comprises liquid ejection data compressed to be capable of line development, a receiving buffer unit comprising a main memory for storing liquid ejection data compressed to be capable of line development, a head controlling unit comprising a register of a liquid ejecting head, a decode unit comprising a decode circuit, which can perform hardware development on liquid ejection data compressed to be capable of line development, wherein the decode unit is coupled to the system bus and local bus in order to transfer data therebetween, a first dedicated bus for coupling the interface unit to the receiving buffer unit, a second dedicated bus for coupling the receiving buffer unit to the decode unit and a third dedicated bus for coupling the decode unit to the head controlling unit, wherein the receiving buffer unit comprises a command storing register which is accessible from the system bus, a header analyzing unit for analyzing a header of the liquid ejection controlling data, a command separating unit for separating a command from the liquid ejection controlling data according to the analysis result of the header analyzing unit and storing the command into the command storing register, and a data transfer controlling unit for storing liquid ejection controlling data, from which the command is separated, into the main memory.

First, the decode circuit performs hardware development on the compressed liquid ejection data on which a conventional program used to perform software development. That is, by independently performing only the development of the compressed data by the decode circuit which is exclusively used for developing compressed data rather than developing the compressed data by a program of single thread which performs various data processes in consecutive order besides the development process of the compressed data, it is possible to perform the development process of the compressed recording data at high speed.

In addition, by the configuration to have two independent buses of the system bus and the local bus and the local memory which is coupled to the local bus, it is possible to secure the data transfer route of the liquid ejection data from an independent memory to the liquid ejecting head while it is separated from an access route from a microprocessor to a memory. Therefore, it is possible to perform the data transfer from the local memory to a register of the liquid ejecting head through the local bus not synchronized with the system bus. Owing to this, it is prevented that the data transfer from the memory to the liquid ejecting head gets interrupted by the access from the microprocessor to the memory so that the recording performance speed gets low because the data transfer delay of liquid ejection data occurs.

Further, in regard to the liquid ejection controlling data transferred from the interface unit to the receiving buffer unit via the first dedicated bus, its header is analyzed by the header analyzing means of the receiving buffer unit. In regard to the liquid ejection controlling data of which the header has been analyzed, the command is separated and stored in the command storing register based on this analysis result, and the liquid ejection controlling data from which the command has been separated is stored in the main memory by the data controlling means. The command is a controlling command for performing the liquid ejection control. The command stored in the command storing register is accessed by the microprocessor via the system bus, and the microprocessor analyzes the command to perform the liquid ejection control based on the command. And, the liquid ejection controlling data stored in the main memory is transferred to the decode unit via the second dedicated bus, then the liquid ejection data, which is included in the liquid ejection controlling data, compressed to be capable of line development is developed by the decode unit, then it is stored in the local memory via the local bus in advance, and then it is transferred to the register of the head controlling unit via the third dedicated bus from the decode unit. That is, the header analysis process of the liquid ejection controlling data on which a conventional program performs software process and the processes storing the command into the command storing register and storing the compressed recording data into the main memory by separating the command from the liquid ejection controlling data based on the header analysis result are performed in the receiving buffer unit. And, the liquid ejection controlling data received by the interface unit is transferred to the receiving buffer unit via the first dedicated bus, the liquid ejection controlling data stored in the main memory of the receiving buffer unit is transferred to the decode unit via the second dedicated bus, the liquid ejection data, which is included in the liquid ejection controlling data, compressed to be capable of line development is developed by the decode unit, and the developed liquid ejection data is transferred to the head controlling unit via the third dedicated bus. Owing to this, since the data transfer load of the system bus and the processing load of the microprocessor on the system bus can be significantly reduced, data transfer can be performed while the dependence on the microprocessor is considerably low, and thus the data transfer processes between the interface unit and the decode unit and between the decode unit and the liquid ejecting head can be performed at higher speed.

Owing to this, according to the data transferring apparatus for transferring liquid ejection data relating to the first aspect of the present invention, since it is possible to realize the development process of compressed data at high speed and the data transfer to the liquid ejecting head at high speed by the two independent buses of the system bus and the local bus and the decode unit comprising the decode circuit, the action and effect that it is possible to considerably increase the liquid ejection speed of the liquid ejecting apparatus compared with that of the prior art can be obtained.

In addition, since the data transfer load of the system bus and the processing load of the microprocessor on the system bus can be significantly reduced, besides the data transfer processes between the interface unit and the decode unit and between the decode unit and the liquid ejecting head can be performed at higher speed, the action and effect that it is possible to further increase the liquid ejection speed of the liquid ejecting apparatus can be obtained.

According to the second aspect of the present invention, in regard to the first aspect described above, the receiving buffer unit further comprises a data separating unit for separating the liquid ejection controlling data stored in the main memory into a remote command and liquid ejection data compressed to be capable of line development, the remote command is processed by a microprocessor coupled to the system bus, and the liquid ejection data compressed to be capable of line development is transferred to the decode unit.

Here, the remote command is a command wherein any header is not attached, such control command as interruption control or reset control during liquid ejection control execution by the command. In case the liquid ejection controlling data wherein this remote command is stored in the main memory also includes the liquid ejection data compressed to be capable of line development, since the data separating means for separating the remote command and the liquid ejection data compressed to be capable of line development is provided in the receiving buffer unit in order that the microprocessor processes only the remote command via the system bus, only the liquid ejection data compressed to be capable of line development can be transferred to the decode unit.

According to the third aspect of the present invention, a data transferring apparatus for transferring liquid ejection data, comprises a bus system, which comprises two independent bus systems of a system bus and a local bus, a local memory coupled to the local bus in order to be able to transfer data to the local bus, an interface unit for receiving liquid ejection controlling data which comprises liquid ejection data compressed to be capable of line development, a receiving buffer unit comprising a main memory for storing liquid ejection data compressed to be capable of line development, a head controlling unit comprising a register of a liquid ejecting head, a decode unit comprising a decode circuit, which can perform hardware development on liquid ejection data compressed to be capable of line development, wherein the decode unit is coupled to the system bus and local bus in order to transfer data therebetween, a first dedicated bus for coupling the interface unit to the receiving buffer unit, a second dedicated bus for coupling the receiving buffer unit to the decode unit and a third dedicated bus for coupling the decode unit to the head controlling unit, wherein the receiving buffer unit comprises a data transfer controlling unit for storing liquid ejection controlling data received by the interface unit into the main memory, and a data separating unit for separating the liquid ejection controlling data stored in the main memory into a command and liquid ejection data compressed to be capable of line development, wherein the command is processed by a microprocessor coupled to the system bus, and the liquid ejection data compressed to be capable of line development is transferred to the decode unit.

First, the decode circuit performs hardware development on the compressed liquid ejection data on which a conventional program used to perform software development. That is, by independently performing only the development of the compressed data by the decode circuit which is exclusively used for developing compressed data rather than developing the compressed data by a program of single thread which performs various data processes in consecutive order besides the development process of the compressed data, it is possible to perform the development process of the compressed recording data at high speed. In addition, by the configuration to have two independent buses of the system bus and the local bus and the local memory which is coupled to the local bus, it is possible to secure the data transfer route of the liquid ejection data from an independent memory to the liquid ejecting head while it is separated from an access route from a microprocessor to a memory. Therefore, it is possible to perform the data transfer from the local memory to a register of the liquid ejecting head through the local bus not synchronized with the system bus. Owing to this, it is prevented that the data transfer from the memory to the liquid ejecting head gets interrupted by the access from the microprocessor to the memory so that the recording performance speed gets low because the data transfer delay of liquid ejection data occurs.

Further, the liquid ejection controlling data transferred from the interface unit to the receiving buffer unit via the first dedicated bus is stored in the main memory. The liquid ejection controlling data is stored in the main memory is separated into the command and the liquid ejection data compressed to be capable of line development by the data separating means when it is transferred to the decode unit via the second dedicated bus. The command is a controlling command for performing the liquid ejection control. The command is processed by the microprocessor via the system bus, and the microprocessor analyzes the command to perform the liquid ejection control based on the command. And, the liquid ejection data compressed to be capable of line development is transferred to the decode unit via the second dedicated bus, then developed by the decode circuit, and then transferred to the register of the head controlling unit via the third dedicated bus. Further, the command includes, for example, a remote command which is such control command as interruption control or reset control during liquid ejection control execution.

That is, when the liquid ejection controlling data received by the interface unit is transferred to the receiving buffer unit via the first dedicated bus, and the liquid ejection controlling data stored in the main memory of the receiving buffer unit is transferred to the decode unit via the second dedicated bus, the process separating the command and the remote command from the liquid ejection controlling data on which a conventional program performs software process are performed in the receiving buffer unit. And, the liquid ejection data compressed to be capable to line development is developed by the decode circuit, and the developed liquid ejection data is transferred to the head controlling unit via the third dedicated bus. Owing to this, since the data transfer load of the system bus and the processing load of the microprocessor on the system bus can be significantly reduced, data transfer can be performed while the dependence on the microprocessor is considerably low, and thus the data transfer processes between the interface unit and the decode unit and between the decode unit and the liquid ejecting head can be performed at higher speed.

Owing to this, according to the data transferring apparatus for transferring liquid ejection data relating to the first aspect of the present invention, since it is possible to realize the development process of compressed data at high speed and the data transfer to the liquid ejecting head at high speed by the two independent buses of the system bus and the local bus and the decode unit comprising the decode circuit, the action and effect that it is possible to considerably increase the liquid ejection speed of the liquid ejecting apparatus compared with that of the prior art can be obtained.

In addition, since the data transfer load of the system bus and the processing load of the microprocessor on the system bus can be significantly reduced, besides the data transfer processes between the interface unit and the decode unit and between the decode unit and the liquid ejecting head can be performed at higher speed, the action and effect that it is possible to further increase the liquid ejection speed of the liquid ejecting apparatus can be obtained.

According to the fourth aspect of the present invention, in regard to the third aspect described above, wherein the decode unit further comprises a line buffer for storing the liquid ejection data developed by the decode circuit by word unit, and a DMA transferring unit for performing DMA transfer on the liquid ejection data compressed to be capable of line development to the decode circuit from the main memory, performing DMA transfer on the liquid ejection data developed in the line buffer to the local memory by word unit, and performing sequential DMA transfer on the developed liquid ejection data stored in the local memory to the register of the liquid ejecting head.

In this way, since the line buffer is provided to store the developed data per word unit, the compressed data developed by a conventional program one byte each is developed per word unit (2 bytes), stored in the line buffer and transferred per word unit. That is, since the amount of the compressed data to be transferred at a time becomes twice that of the conventional way, the development process of the compressed data can be performed at high speed. Further, the high-speed data transfer can be achieved by the DMA (Direct Memory Access) transfer. The DMA transfer is such well-known transfer method as once addresses of a transfer source and a transfer destination or the number of transfer are set in a register, then the data transfer can be performed at high speed by hardware without the microprocessor.

According to the fifth aspect of the present invention, in regard to the fourth aspect described above, wherein the line buffer further comprises two (2) faces of buffer areas for storing developed data of predetermined words, the liquid ejection data developed by the decode circuit is sequentially stored in a first face of the buffer areas, while the liquid ejection data developed by the decode circuit is sequentially stored in a second face of the buffer areas when the developed data of predetermined words is accumulated, and DMA transfer to the local memory is performed per predetermined words with respect to the developed data when the developed data of predetermined words is accumulated.

In this way, the line buffer has two faces of buffer areas which are capable of storing the developed data of predetermined bytes, and stores the data which has been developed by the decode circuit in a first face of the buffer areas, and when predetermined bytes have been accumulated, the developed data of the first face is transferred per word unit by the DMA transferring means, while the data developed by the decoded circuit can be stored in a second face of the buffer areas, so that it is possible to perform development process of compressed recording data and data transfer process in parallel.

Owing to this, according to the data transferring apparatus for transferring liquid ejection data relating to the fifth aspect of the present invention, added to the fourth aspect described above, the development process of compressed recording data and the data transfer process can be perform in parallel, and thus the action and effect that it is possible to further increase the liquid ejection speed of the liquid ejecting apparatus can be obtained.

According to the sixth aspect of the present invention, in regard to the fifth aspect described above, wherein one (1) ASIC comprises the interface unit, the receiving buffer unit, the decode unit, the head controlling unit and the first, second and third dedicated buses.

In this way, since the interface unit, the receiving buffer unit, the decode unit and the head controlling unit are configured as circuit blocks in the same ASIC, and the first, second and third dedicated buses, which couple them respectively, is configured to be in the same ASIC, high speed DMA transfer can be performed particularly with one clock. Therefore, the compressed liquid ejection data can be transferred to the decode unit at higher speed.

Owing to this, according to the data transferring apparatus for transferring liquid ejection data relating to the sixth aspect of the present invention, added to the fifth aspect described above, since the compressed liquid ejection data can be transferred to the decode unit at higher speed, and besides the transfer of the developed liquid ejection data to the liquid ejecting head from the local memory can be performed at high-speed, the action and effect that it is possible to further increase the liquid ejection speed of the liquid ejecting apparatus can be obtained.

According to the seventh aspect of the present invention, in regard to the sixth aspect described above, wherein the data transfer to the local memory from the decode unit and to the register of the liquid ejecting head from the local memory on the local bus is performed by burst transfer.

The burst transfer is such data transfer method which is a well-known method for speeding up the data transfer as when the continuous data is transferred, the data is transferred while a bus is occupied until all data of a predetermined data block is completely transferred by omitting a part of a sequence such as an address designation so as to increase the data transfer speed. And, since the data transfer to the liquid ejecting head performed via the system bus in the conventional method is per formed via the local bus separated from the system bus, the data transfers from the decode unit to the local memory via the local bus and from the local memory to the register of the liquid ejecting head can be performed in the burst transfer.

That is, in regard to the conventional data transferring apparatus performing the data transfer from the main memory to the liquid ejecting head via the system bus, if the transfer is performed while the bus is occupied until all data of predetermined data blocks is completely transferred to the liquid ejecting head, such problem occurs as the data transfer requested by a microprocessor cannot performed, however, in regard to the local bus independent of the system bus, this problem does not occur, and thus the data transfer to the liquid ejecting head via the local bus can be performed in the burst transfer.

Owing to this, according to the data transferring apparatus for transferring liquid ejection data relating to the seventh aspect of the present invention, added to the sixth aspect described above, the data transfer to the liquid ejecting head via the local bus can be performed in the burst transfer, and thus the action and effect that it is possible to further increase the liquid ejection speed of the liquid ejecting apparatus can be obtained.

In addition, since the system bus and the local are independent each other, and the data transfer to the register of the liquid ejecting head not synchronized with the system bus can be performed by the decode circuit of the decode unit and the line buffer, the action and effect that it is possible to maximize the effect of increasing the liquid ejection speed of the liquid ejecting apparatus can be obtained.

According to the eighth aspect of the present invention, in regard to the seventh aspect described above, wherein the compressed liquid ejection data is run length compression data, and the decode circuit can perform hardware development on run length compression data.

According to the data transferring apparatus for transferring liquid ejection data relating to the eighth aspect of the present invention, by the decode circuit whereby the run length compressed data capable of line development can be hardware-developed, the action and effect in the seventh aspect described above can be achieved.

According to the ninth aspect of the present invention, in regard to the eighth aspect described above, wherein the decode unit further comprises a means for storing uncompressed liquid ejection data, which is DMA-transferred from the main memory, into the line buffer without hardware development by the decode circuit.

According to the data transferring apparatus for transferring liquid ejection data relating to the ninth aspect of the present invention, added to the eighth aspect described above, if the liquid ejection data stored in the main memory is uncompressed data, a means stores it the line buffer as it is without hardware development by the decode circuit, and thus the action and effect that it is possible to further increase the liquid ejection speed of the liquid ejecting apparatus in regard to the uncompressed liquid ejection data can be obtained.

According to the tenth aspect of the present invention, a liquid ejecting apparatus comprises a data transferring apparatus for transferring liquid ejection data, the data transferring apparatus comprising a bus system, which comprises two independent bus systems of a system bus and a local bus, a local memory coupled to the local bus in order to be able to transfer data to the local bus, an interface unit for receiving liquid ejection controlling data which comprises liquid ejection data compressed to be capable of line development, a receiving buffer unit comprising a main memory for storing liquid ejection data compressed to be capable of line development, a head controlling unit comprising a register of a liquid ejecting head, a decode unit comprising a decode circuit, which can perform hardware development on liquid ejection data compressed to be capable of line development, wherein the decode unit is coupled to the system bus and local bus in order to transfer data therebetween, a first dedicated bus for coupling the interface unit to the receiving buffer unit, a second dedicated bus for coupling the receiving buffer unit to the decode unit and a third dedicated bus for coupling the decode unit to the head controlling unit, where in the receiving buffer unit comprises a command storing register which is accessible from the system bus, a header analyzing unit for analyzing a header of the liquid ejection controlling data, a command separating unit for separating a command from the liquid ejection controlling data according to the analysis result of the header analyzing unit and storing the command into the command storing register, and a data transfer controlling unit for storing liquid ejection controlling data, from which the command is separated, into the main memory.

According to the liquid ejecting apparatus relating to the tenth aspect of the present invention, in regard to the liquid ejecting apparatus, the action and effect by the first aspect described above can be obtained.

According to the eleventh aspect of the present invention, a liquid ejecting apparatus comprises a data transferring apparatus for transferring liquid ejection data, the data transferring apparatus comprising a bus system, which comprises two independent bus systems of a system bus and a local bus, a local memory coupled to the local bus in order to be able to transfer data to the local bus, an interface unit for receiving liquid ejection controlling data which comprises liquid ejection data compressed to be capable of line development, a receiving buffer unit comprising a main memory for storing liquid ejection data compressed to be capable of line development, a head controlling unit comprising a register of a liquid ejecting head, a decode unit comprising a decode circuit, which can perform hardware development on liquid ejection data compressed to be capable of line development, wherein the decode unit is coupled to the system bus and local bus in order to transfer data therebetween, a first dedicated bus for coupling the interface unit to the receiving buffer unit, a second dedicated bus for coupling the receiving buffer unit to the decode unit and a third dedicated bus for coupling the decode unit to the head controlling unit, wherein the receiving buffer unit comprises a data transfer controlling unit for storing liquid ejection controlling data received by the interface unit into the main memory, and a data separating unit for separating the liquid ejection controlling data stored in the main memory into a command and liquid ejection data compressed to be capable of line development, wherein the command is processed by a microprocessor coupled to the system bus, and the liquid ejection data compressed to be capable of line development is transferred to the decode unit.

According to the liquid ejecting apparatus relating to the eleventh aspect of the present invention, in regard to the liquid ejecting apparatus, the action and effect by the third aspect described above can be obtained.

According to the twelfth aspect of the present invention, a data transferring apparatus for transferring liquid ejection data, comprises a bus system, which comprises two independent bus systems of a system bus and a local bus, a local memory coupled to the local bus in order to be able to transfer data to the local bus, an interface unit for receiving liquid ejection controlling data which comprises liquid ejection data compressed to be capable of line development, a receiving buffer unit comprising a main memory for storing liquid ejection data compressed to be capable of line development, a head controlling unit comprising a register of a liquid ejecting head, a decode unit comprising a decode circuit, which can perform hardware development on liquid ejection data compressed to be capable of line development, wherein the decode unit is coupled to the system bus and local bus in order to transfer data therebetween, a first dedicated bus for coupling the interface unit to the receiving buffer unit, a second dedicated bus for coupling the receiving buffer unit to the decode unit and a third dedicated bus for coupling the decode unit to the head controlling unit, wherein the interface unit comprises a command storing register which is accessible from the system bus, a header analyzing unit for analyzing a header of the liquid ejection controlling data, a command separating unit for separating a command from the liquid ejection controlling data according to the analysis result of the header analyzing unit and storing the command into the command storing register, and a data transfer controlling unit for storing liquid ejection controlling data, from which the command is separated, into the main memory.

First, the decode circuit performs hardware development on the compressed liquid ejection data on which a conventional program used to perform software development. That is, by independently performing only the development of the compressed data by the decode circuit which is exclusively used for developing compressed data rather than developing the compressed data by a program of single thread which performs various data processes in consecutive order besides the development process of the compressed data, it is possible to perform the development process of the compressed recording data at high speed.

Further, by the configuration to have two independent buses of the system bus and the local bus and the local memory which is coupled to the local bus, it is possible to secure the data transfer route of the liquid ejection data from an independent memory to the liquid ejecting head while it is separated from an access route from a microprocessor to a memory. Therefore, it is possible to perform the data transfer from the local memory to a register of the liquid ejecting head through the local bus not synchronized with the system bus. Owing to this, it is prevented that the data transfer from the memory to the liquid ejecting head gets interrupted by the access from the microprocessor to the memory so that the recording performance speed gets low because the data transfer delay of liquid ejection data occurs.

Further, in regard to the liquid ejection controlling data received by the interface unit, its header is analyzed by the header analyzing means of the interface unit. In regard to the liquid ejection controlling data of which the header has been analyzed, the command is separated and stored in the command storing register based on this analysis result, and the liquid ejection controlling data from which the command has been separated is stored in the main memory of the receiving buffer unit by the data controlling means via the first dedicated bus. The command stored in the command storing register is accessed by the microprocessor via the system bus, and the microprocessor performs the command analysis. And, the liquid ejection controlling data stored in the main memory is transferred to the decode unit via the second dedicated bus, then the liquid ejection data, which is included in the liquid ejection controlling data, compressed to be capable of line development is developed by the decode unit, then it is stored in the local memory via the local bus in advance, and then it is transferred to the register of the head controlling unit via the third dedicated bus from the decode unit. That is, the header analysis process of the liquid ejection controlling data on which a conventional program performs software process and the processes storing the command into the command storing register and storing the compressed recording data into the main memory by separating the command from the liquid ejection controlling data based on the header analysis result are performed in the interface unit. And, the liquid ejection controlling data from which the command is separated by the command analysis of the interface unit via the first dedicated bus is transferred to the receiving buffer unit and stored in the main memory, the liquid ejection controlling data stored in the main memory of the receiving buffer unit is transferred to the decode unit via the second dedicated bus, the liquid ejection data developed by the decode circuit, is transferred to the head controlling unit via the third dedicated bus. Owing to this, the data transfer load of the system bus and the processing load of the microprocessor on the system bus can be significantly reduced, and besides the data transfer processes between the interface unit and the decode unit and between the decode unit and the liquid ejecting head can be performed at higher speed.

Owing to this, according to the data transferring apparatus for transferring liquid ejection data relating to the twelfth aspect of the present invention, since it is possible to realize the development process of compressed data at high speed and the data transfer to the liquid ejecting head at high speed by the two independent buses of the system bus and the local bus and the decode unit comprising the decode circuit, the action and effect that it is possible to considerably increase the liquid ejection speed of the liquid ejecting apparatus compared with that of the prior art can be obtained.

In addition, since the data transfer load of the system bus and the processing load of the microprocessor on the system bus can be significantly reduced, besides the data transfer processes between the interface unit and the decode unit and between the decode unit and the liquid ejecting head can be performed at higher speed, the action and effect that it is possible to further increase the liquid ejection speed of the liquid ejecting apparatus can be obtained.

According to the thirteenth aspect of the present invention, in regard to the twelfth aspect described above, wherein the receiving buffer unit further comprises a data separating unit for separating the liquid ejection controlling data stored in the main memory into a remote command and liquid ejection data compressed to be capable of line development, the remote command is processed by a microprocessor coupled to the system bus, and the liquid ejection data compressed to be capable of line development is transferred to the decode unit.

Here, the remote command is a command where in any header is not attached, such control command as interruption control or reset control during liquid ejection control execution by the command. In case the liquid ejection controlling data wherein this remote command is stored in the main memory also includes the liquid ejection data compressed to be capable of line development, since the data separating means for separating the remote command and the liquid ejection data compressed to be capable of line development is provided in the receiving buffer unit in order that the microprocessor processes only the remote command via the system bus, only the liquid ejection data compressed to be capable of line development can be transferred to the decode unit.

According to the fourteenth aspect of the present invention, in regard to the thirteenth aspect described above, wherein the decode unit further comprises a line buffer for storing the liquid ejection data developed by the decode circuit by word unit, and a DMA transferring unit for performing DMA transfer on the liquid ejection data compressed to be capable of line development to the decode circuit from the main memory, performing DMA transfer on the liquid ejection data developed in the line buffer to the local memory by word unit, and performing sequential DMA transfer on the developed liquid ejection data stored in the local memory to the register of the liquid ejecting head.

In this way, since the line buffer is provided to store the developed data per word unit, the compressed data developed by a conventional program one byte each is developed per word unit (2 bytes), stored in the line buffer and transferred per word unit. That is, since the amount of the compressed data to be transferred at a time becomes twice that of the conventional way, the development process of the compressed data can be performed at high speed. Further, the high-speed data transfer can be achieved by the DMA (Direct Memory Access) transfer. The DMA transfer is such well-known transfer method as once addresses of a transfer source and a transfer destination or the number of transfer are set in a register, then the data transfer can be performed at high speed by hardware without the microprocessor.

According to the fifteenth aspect of the present invention, in regard to the fourteenth aspect described above, wherein the line buffer further comprises two (2) faces of buffer areas for storing developed data of predetermined words, the liquid ejection data developed by the decode circuit is sequentially stored in a first face of the buffer areas, while the liquid ejection data developed by the decode circuit is sequentially stored in a second face of the buffer areas when the developed data of predetermined words is accumulated, and DMA transfer to the local memory is performed per predetermined words with respect to the developed data when the developed data of predetermined words is accumulated.

In this way, the line buffer has two faces of buffer areas which are capable of storing the developed data of predetermined bytes, and stores the data which has been developed by the decode circuit in a first face of the buffer areas, and when predetermined bytes have been accumulated, the developed data of the first face is transferred per word unit by the DMA transferring means, while the data developed by the decoded circuit can be stored in a second face of the buffer areas, so that it is possible to perform development process of compressed recording data and data transfer process in parallel.

Owing to this, according to the data transferring apparatus for transferring liquid ejection data relating to the fifteenth aspect of the present invention, added to the fourteenth aspect described above, the development process of compressed recording data and the data transfer process can be perform in parallel, and thus the action and effect that it is possible to further increase the liquid ejection speed of the liquid ejecting apparatus can be obtained.

According to the sixteenth aspect of the present invention, in regard to the fifteenth aspect described above, wherein one (1) ASIC comprises the interface unit, the receiving buffer unit, the decode unit, the head controlling unit and the first, second and third dedicated buses.

In this way, since the interface unit, the receiving buffer unit, the decode unit and the head controlling unit are configured as circuit blocks in the same ASIC, and the first, second and third dedicated buses, which couple them respectively, is configured to be in the same ASIC, high speed DMA transfer can be performed particularly with one clock. Therefore, the compressed liquid ejection data can be transferred to the decode unit at higher speed.

Owing to this, according to the data transferring apparatus for transferring liquid ejection data relating to the sixteenth aspect of the present invention, added to the fifteenth aspect described above, since the compressed liquid ejection data can be transferred to the decode unit at higher speed, and besides the transfer of the developed liquid ejection data to the liquid ejecting head from the local memory can be performed at high speed, the action and effect that it is possible to further increase the liquid ejection speed of the liquid ejecting apparatus can be obtained.

According to the seventeenth aspect of the present invention, in regard to the sixteenth aspect described above, wherein the data transfer to the local memory from the decode unit and to the register of the liquid ejecting head from the local memory on the local bus is performed by burst transfer.

The burst transfer is such data transfer method which is a well-known method for speeding up the data transfer as when the continuous data is transferred, the data is transferred while a bus is occupied until all data of a predetermined data block is completely transferred by omitting a part of a sequence such as an address designation so as to increase the data transfer speed. And, since the data transfer to the liquid ejecting head performed via the system bus in the conventional method is per formed via the local bus separated from the system bus, the data transfers from the decode unit to the local memory via the local bus and from the local memory to the register of the liquid ejecting head can be performed in the burst transfer.

That is, in regard to the conventional data transferring apparatus performing the data transfer from the main memory to the liquid ejecting head via the system bus, if the transfer is performed while the bus is occupied until all data of predetermined data blocks is completely transferred to the liquid ejecting head, such problem occurs as the data transfer requested by a microprocessor cannot performed, however, in regard to the local bus independent of the system bus, this problem does not occur, and thus the data transfer to the liquid ejecting head via the local bus can be performed in the burst transfer.

Owing to this, according to the data transferring apparatus for transferring liquid ejection data relating to the seventeenth aspect of the present invention, added to the sixteenth aspect described above, the data transfer to the liquid ejecting head via the local bus can be performed in the burst transfer, and thus the action and effect that it is possible to further increase the liquid ejection speed of the liquid ejecting apparatus can be obtained.

In addition, since the system bus and the local are independent each other, and the data transfer to the register of the liquid ejecting head not synchronized with the system bus can be performed by the decode circuit of the decode unit and the line buffer, the action and effect that it is possible to maximize the effect of increasing the liquid ejection speed of the liquid ejecting apparatus can be obtained.

According to the eighteenth aspect of the present invention, in regard to the seventeenth aspect described above, wherein the compressed liquid ejection data is run length compression data, and the decode circuit can perform hardware development on run length compression data.

According to the data transferring apparatus for transferring liquid ejection data relating to the eighteenth aspect of the present invention, by the decode circuit whereby the run length compressed data capable of line development can be hardware-developed, the action and effect in the seventeenth aspect described above can be achieved.

According to the nineteenth aspect of the present invention, in regard to the eighteenth aspect described above, wherein the decode unit further comprises a means for storing uncompressed liquid ejection data, which is DMA-transferred from the main memory, into the line buffer without hardware development by the decode circuit.

According to the data transferring apparatus for transferring liquid ejection data relating to the nineteenth aspect of the present invention, added to the eighteenth aspect described above, if the liquid ejection data stored in the main memory is uncompressed data, a means stores it the line buffer as it is without hardware development by the decode circuit, and thus the action and effect that it is possible to further increase the liquid ejection speed of the liquid ejecting apparatus in regard to the uncompressed liquid ejection data can be obtained.

According to the twentieth aspect of the present invention, a liquid ejecting apparatus comprises a data transferring apparatus for transferring liquid ejection data, the data transferring apparatus comprising a bus system, which comprises two independent bus systems of a system bus and a local bus, a local memory coupled to the local bus in order to be able to transfer data to the local bus, an interface unit for receiving liquid ejection controlling data which comprises liquid ejection data compressed to be capable of line development, a receiving buffer unit comprising a main memory for storing liquid ejection data compressed to be capable of line development, a head controlling unit comprising a register of a liquid ejecting head, a decode unit comprising a decode circuit, which can perform hardware development on liquid ejection data compressed to be capable of line development, wherein the decode unit is coupled to the system bus and local bus in order to transfer data therebetween, a first dedicated bus for coupling the interface unit to the receiving buffer unit, a second dedicated bus for coupling the receiving buffer unit to the decode unit and a third dedicated bus for coupling the decode unit to the head controlling unit, wherein the interface unit comprises a command storing register which is accessible from the system bus, a header analyzing unit for analyzing a header of the liquid ejection controlling data, a command separating unit for separating a command from the liquid ejection controlling data according to the analysis result of the header analyzing unit and storing the command into the command storing register, and a data transfer controlling unit for storing liquid ejection controlling data, from which the command is separated, into the main memory.

According to the liquid ejecting apparatus relating to the twentieth aspect of the present invention, in regard to the liquid ejecting apparatus, the action and effect by the twelfth aspect described above can be obtained.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIG. 10 is a diagram showing such flow as compressed recording data is developed.

FIGS. 11A to 11D are diagrams showing the recording data after development.

DETAILED DESCRIPTION OF THE INVENTION

Hereinafter, the preferred embodiments of the present invention will now be described based on drawings.

Figure 1:
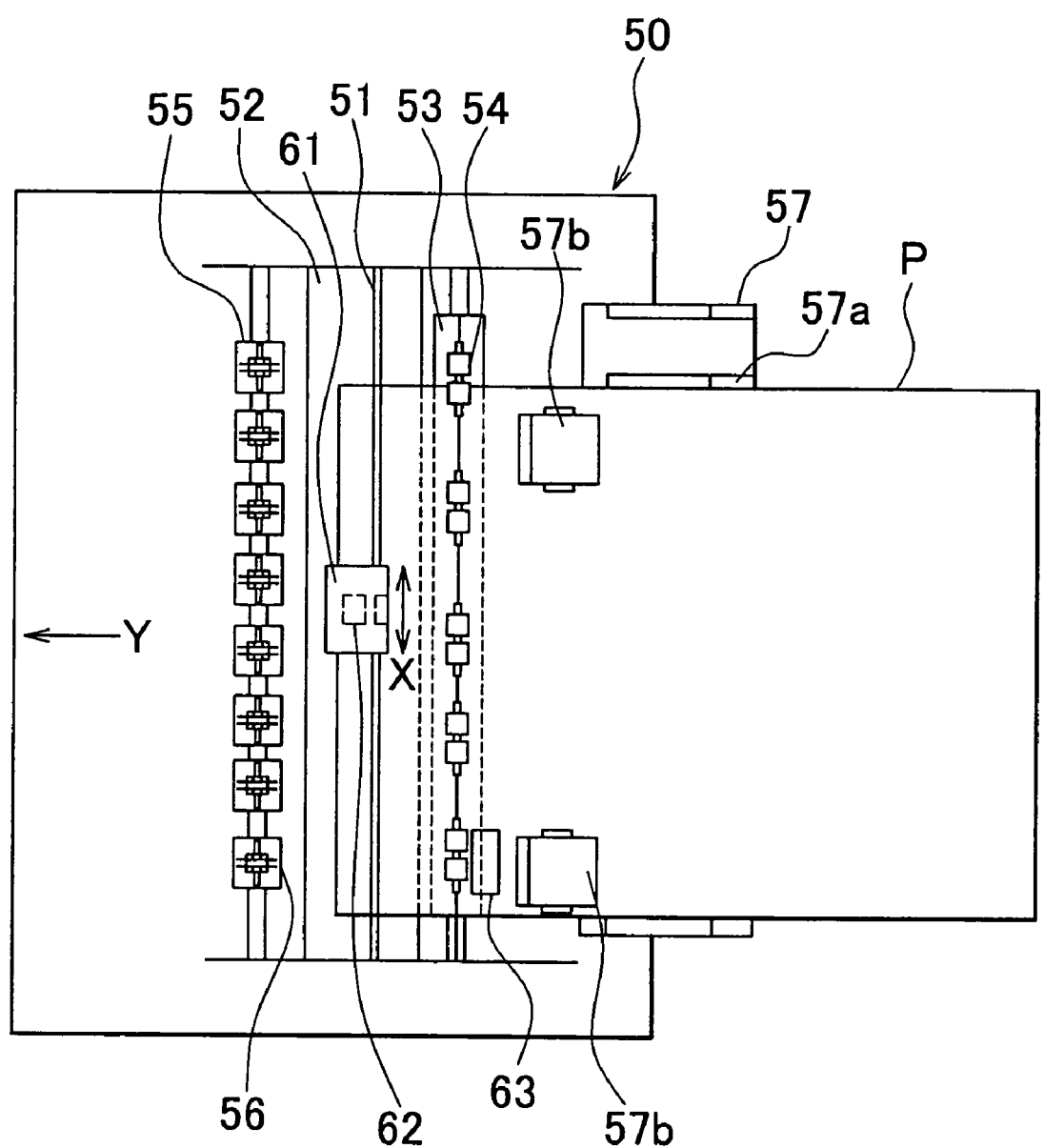
FIG. 1 is a plan view of an inkjet type recording apparatus relating to the present invention.
Figure 2:
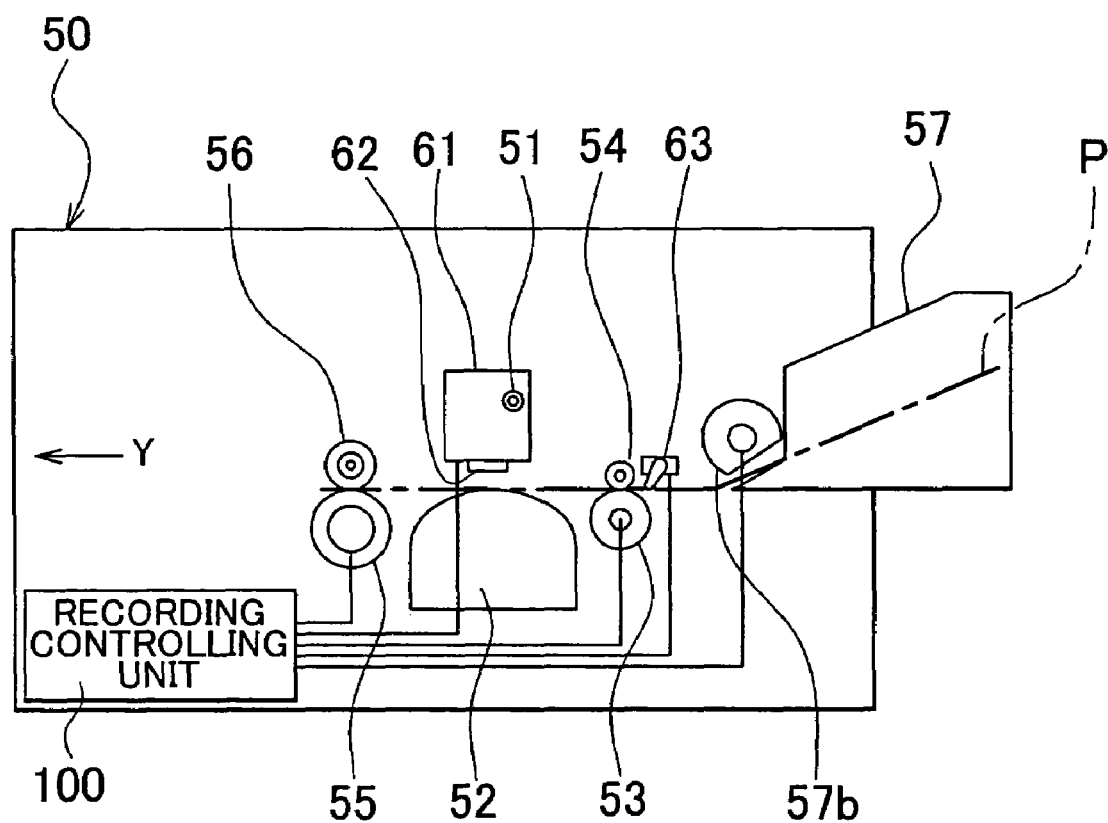
FIG. 2 is a side view of an inkjet type recording apparatus relating to the present invention.

To begin with, a first embodiment of the inkjet type recording apparatus will be described as "liquid ejecting apparatus" relating to the present invention. FIG. 1 is a schematic plan view of an inkjet type recording apparatus relating to the present invention, and FIG. 2 is a side view of it.

In the inkjet type recording apparatus 50, a carriage 61 is provided to move along a main scanning direction X as a recording means which performs recording on recording papers P, rotatably supported by carriage guide shaft 51. On the carriage 61, a recording head 62 is mounted as a "liquid ejecting head" which performs recording by ejecting ink onto the recording papers P. Opposite to the recording head 62, a platen 52 is provided to control a gap between the head surface of the recording head 62 and the recording papers P. And, recording on the recording papers P is performed by repeating an operation of carrying the recording papers P between the carriage 61 and the platen 52 in a sub scanning direction Y a predetermined amount each and an operation of ejecting ink onto the recording papers P from the recording head 62 while the recording head 62 moves back and forth once in the main scanning direction X.

A paper feeding tray 57 is configured to be capable of feeding the recording papers P such as normal papers or foot papers, and an ASF (Auto Sheet Feeder) is provided in it as a paper feeding means to automatically feed the recording papers P. The ASF is an automatic paper feeding mechanism which has two paper feeding rollers 57b provided in the paper feeding tray 57 and a separating pad not shown in drawings. One of these two paper feeding rollers 57b is arranged at the one side of the paper feeding tray 57 while the other one of the paper feeding rollers 57b is installed at a recording paper guide 57a, and the recording paper guide 57a is provided at the paper feeding tray 57 to be capable of sliding in the longitudinal direction corresponding to the width of the recording papers P. And, by the rotation drive force of the paper feeding roller 57b and the frictional resistance of the separating pad, the plural recording papers P stacked in the paper feeding tray 57 are automatically and accurately fed not all but a piece each during feeding.

As a recording paper carrying means for carrying the recording papers P in the sub scanning direction Y, a driving transfer roller 53 and driven transfer rollers 54 are provided. The driving transfer roller 53 is rotatably controlled by the rotation drive force such as a stepping motor, and by the rotation of the driving transfer roller 53 the recording papers P are carried in the sub scanning direction Y. The driven transfer rollers 54 are provided as plural pieces, and each of them is urged by the driving transfer roller 53 to rotate in contact with the recording papers P as following the carriage of the recording papers P when the recording papers P are carried by the rotation of the driving transfer roller 53. On the surface of the driving transfer roller 53, a film which has high frictional resistance is provided. By the driven transfer rollers 54, the recording papers P pressed onto the surface of the driving transfer roller 53 are firmly in contact with the surface of the driving transfer roller 53 so that they are carried in the sub scanning direction Y by the rotation of the driving transfer roller 53.

And, a paper detector 63 is provided between the paper feeding roller 57b and the driving transfer roller 53 in the well-known art. The paper detector 63 has a lever to which a self-resetting characteristic into an upright position is granted pivotally supported to be rotatable only in the recording paper carriage direction as projecting toward the carriage route of the recording papers P, and is configured as the end of the lever is pushed toward the recording papers P and thus the lever is rotated so that the recording papers P are detected. The paper detector 63 detects the starting end position and the terminal end position of the recording papers P fed by the paper feeding roller 57b, and determines a recording area corresponding to the detected positions to perform recording.

Meanwhile, a driving paper discharge roller 55 and driven paper discharge rollers 56 are provided as a means for discharging the recording papers P which have been recorded. The driving paper discharge roller 55 is rotatably controlled by the rotation drive force such as a stepping motor, and by the rotation of the driving paper discharge roller 55 the recording papers P are carried in the sub scanning direction Y. The driven paper discharge rollers 56 have plural teeth on their circumference, and become a toothed roller in which the end of each tooth is sharp in an acute angle to be in contact with the recording surface of a recording paper P at point. Each of the plural driven paper discharge rollers 56 is urged by the driving paper discharge roller 55 to rotate in contact with the recording papers P as following the discharge of the recording papers P when the recording papers P are carried by the rotation of the driving paper discharge roller 55.

And, the rotation driving motor not shown in drawings which rotatably drives the paper feeding roller 57b or the driving transfer roller 53 and the driving paper discharge roller 55 and the carriage driving motor not shown in drawings which drives the carriage 61 in the main scanning direction are controlled by the recording controlling unit 100. In addition, the recording head is also controlled by the recording controlling unit 100 to eject ink onto the surface of the recording papers P.

Figure 3:
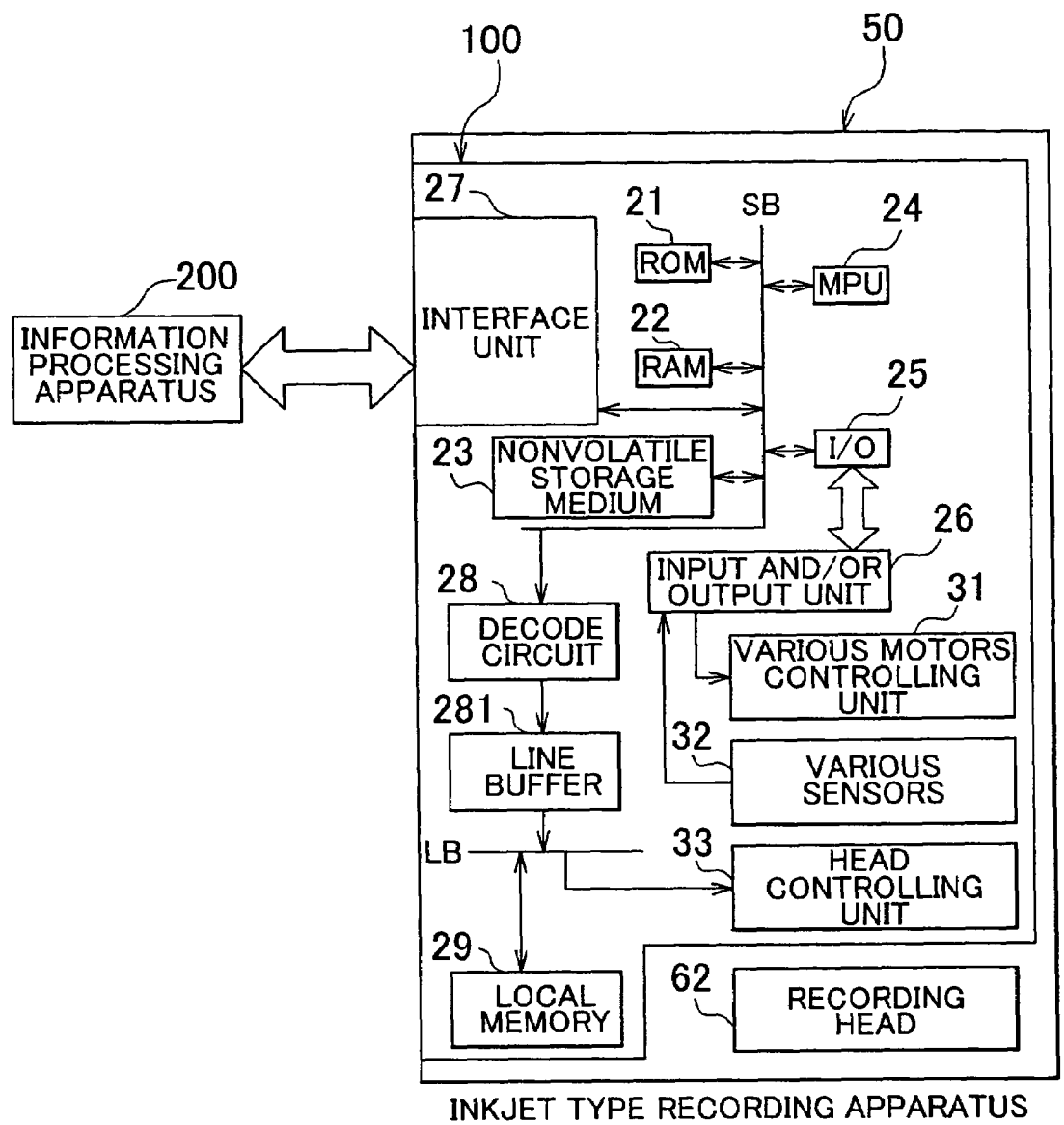
FIG. 3 is a block diagram of an inkjet type recording apparatus relating to the present invention.

FIG. 3 is a schematic flowchart of the inkjet type recording apparatus 50 relating to the present invention.

The inkjet type recording apparatus 50 has a recording controlling unit 100 for controlling carious recording processes. The recording controlling unit 100 has two independent buses, namely, a system bus SB and a local bus LB. To the system bus SB a MPU (microprocessor) 24, a ROM 21, a RAM 22, a nonvolatile storage medium 23, I/O 25 and a decode circuit 28 are coupled so as to be capable of transferring data. In the MPU 24 various calculation processes are performed. In the ROM 21, software/program and data needed for calculation processes of the MPU 24 are stored beforehand. The RAM 22 is used as a temporarily storing area for the software/program or a working area for the MPU 24. And, in the nonvolatile storage medium 23 such as a flash memory some data resulting from the calculation processes of the MPU 24 is stored, and it is designed to hold the data even if the power of the inkjet type recording apparatus 50 is turned off.

Further, the recording controlling unit 100 is configured to be coupled to an information processing apparatus 200 such as a personal computer via an interface unit 27 which has an interface function with external apparatuses, and to be capable of processing input and output of various kinds of information or data with the information processing apparatus 200. And, I/O 25 performs output control to a various motors controlling unit 31 via an input and/or output unit 26 based on the calculation process result of the MPU 24, and allows input information to be inputted from various sensors 32. The various motors controlling unit 31 is a drive control circuit which controls various motors of the inkjet type recording apparatus 50, and is controlled by the recording controlling unit 100. And, the various sensors 32 detect various kinds of condition information of the inkjet type recording apparatus 50 and output them to the I/O 25 via the input and/or output unit 26.

During performing recording, the information processing apparatus 200 plays a host part to output record controlling data (liquid ejection controlling data) including recording data compressed by the information processing apparatus 200 in order to be capable of line development (hereinafter, referred to as compressed recording data), and the inkjet type recording apparatus 50 receives the record controlling data from the interface unit 27. The decode circuit 28 develops the compressed recording data and then stores the developed recording data in a line buffer 281. The developed recording data stored in the line buffer 281 is stored in a local memory via the local bus LB for each data of predetermined words and then transferred from a register in a head controlling unit 33 to the recording head 62 via the local bus LB. The head controlling unit 33 controls the recording head 62 to jet ink of various colors onto he recording papers P from the plural nozzle arrays provided on the head side of the recording head 62.

Figure 4:
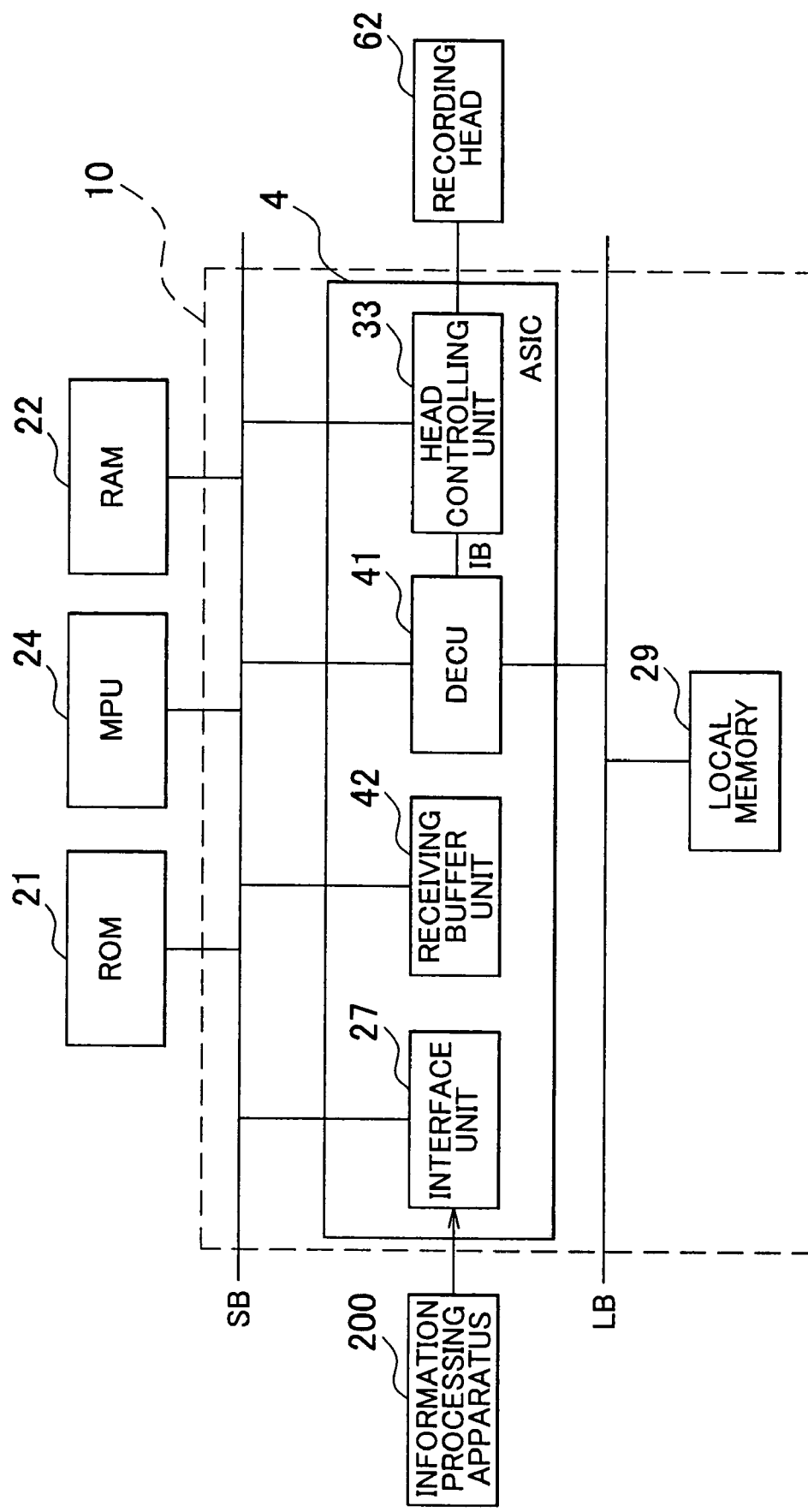
FIG. 4 is a block diagram showing the configuration of a data transferring apparatus.
Figure 5:
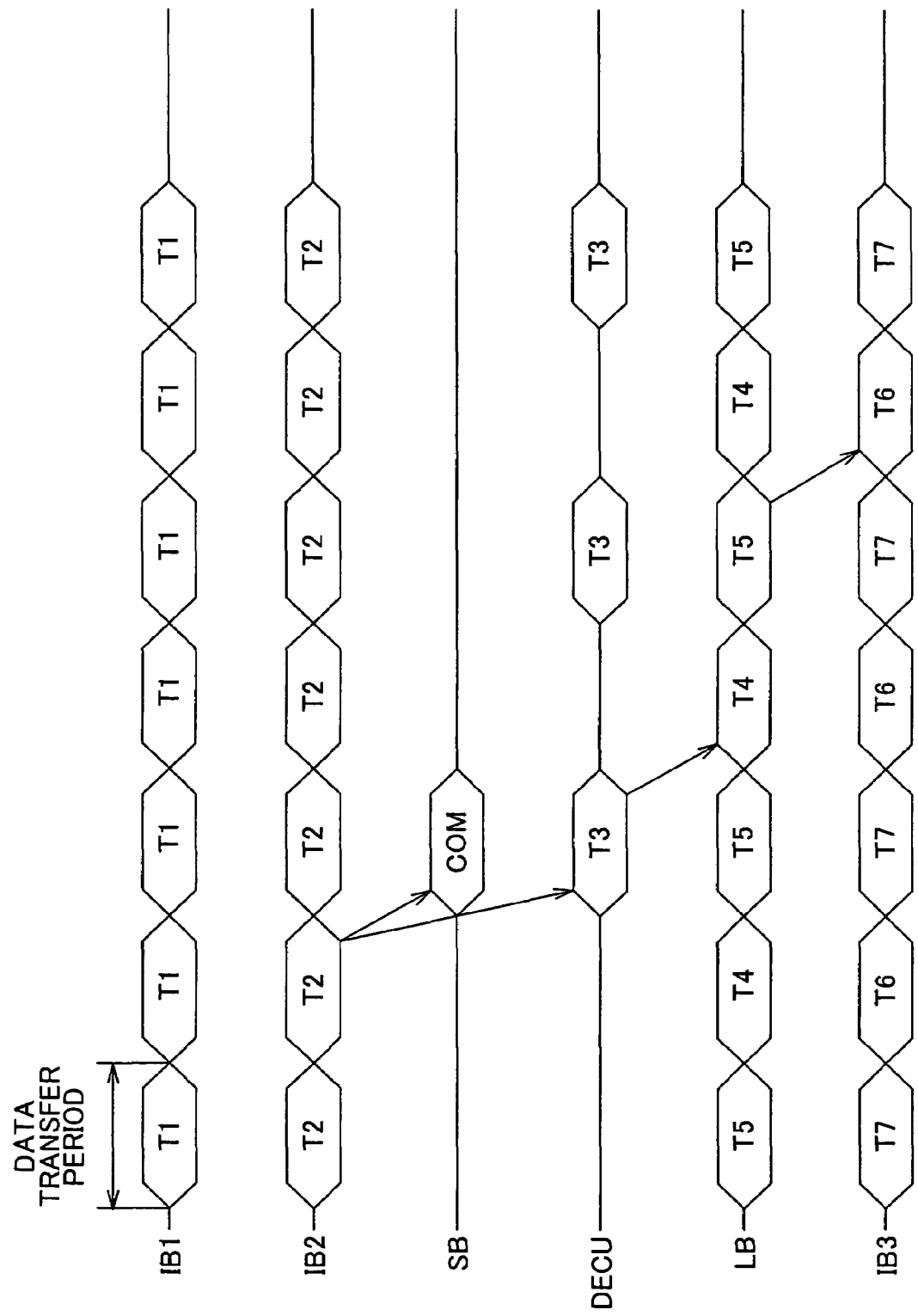
FIG. 5 is a timing chart showing the flow of recording data.

FIG. 4 is a block diagram showing the configuration of a data transferring apparatus as a "data transferring apparatus for transferring liquid ejection data" relating to the present invention. FIG. 5 is a timing chart schematically showing the flow of recording data in a data transferring apparatus.

The data transferring apparatus 10 has an ASIC (Application Specific Integrated Circuit) 4, and the ASIC 4 incorporates the interface unit 27 described above, the head controlling unit 33 described above, a receiving buffer unit 42 and a DECU 41 as a "decode unit". The DECU 41 includes the decode circuit 28 described above, the line buffer 281 and a "DMA transferring means" (It will be described in detail.). And, the system bus SB and the local bus LB are 16 bits buses, and thus it is possible to transfer data of 1 word (2 bytes) per a predetermined data transfer period. Hereinafter, with reference to the timing chart shown in FIG. 5, the flow of recording data in regard to the data transferring apparatus 10 will be described.

The interface unit 27 has a means for sending and receiving data to and from the information processing apparatus 200 taking the information processing apparatus 200 as a host apparatus in a predetermined data transfer sequence, and receives the recording controlling data from the information processing apparatus 200 to allow the recording controlling unit 100 to control recording. The record controlling data includes a command and a remote command on which the MPU 24 performs command analysis and the compressed recording data on which the DECU 41 performs hardware development, and it is sent by the information processing apparatus 200 as a header of 6 bytes is added to it for each data block. The interface unit 27 DMA-transfers the received record controlling data to the receiving buffer unit 42 via a dedicated first bus IB1 at a predetermined data transfer period (symbol T1). As described above, the DMA transfer is such transfer method as once addresses of a transfer source and a transfer destination or the number of transfer are set in a register then the data transfer can be performed by hardware at high speed without the MPU 24. The receiving buffer unit 42 analyzes the header of the record controlling data DMA-transferred from the interface unit 27, extracts the compressed recording data by separating the command and the remote command from the record controlling data and DMA-transfers the compressed recording data to the DECU 41 via a second dedicated bus IB2 at the next data transfer period (symbol T2).

In regard to the command, the MPU 24 accesses the receiving buffer unit 42 via the system bus SB to perform command analysis (symbol COM). The DECU 41 develops the compressed recording data DMA-transferred from the receiving buffer unit 42 at the next data transfer period (symbol T3), and DMA-transfers it to the bitmap area of the local memory 29 via the local bus LB as not synchronized with the data transfer through the system bus SB when the developed recording data has been a predetermined amount (symbol T4). The recording data as bitmap data stored in the bitmap area of the local memory 29 is DMA-transferred again to the DECU 41 via the local bus LB (symbol T5). The DECU 41 DMA-transfers the recording data to the head controlling unit 33 via a third dedicated bus IB3 (symbol T6), then stores it in a register in the head controlling unit 33. The head controlling unit 33 DMA-transfers the recording data stored in the register to the recording head 62 (symbol T7).

Figure 6:
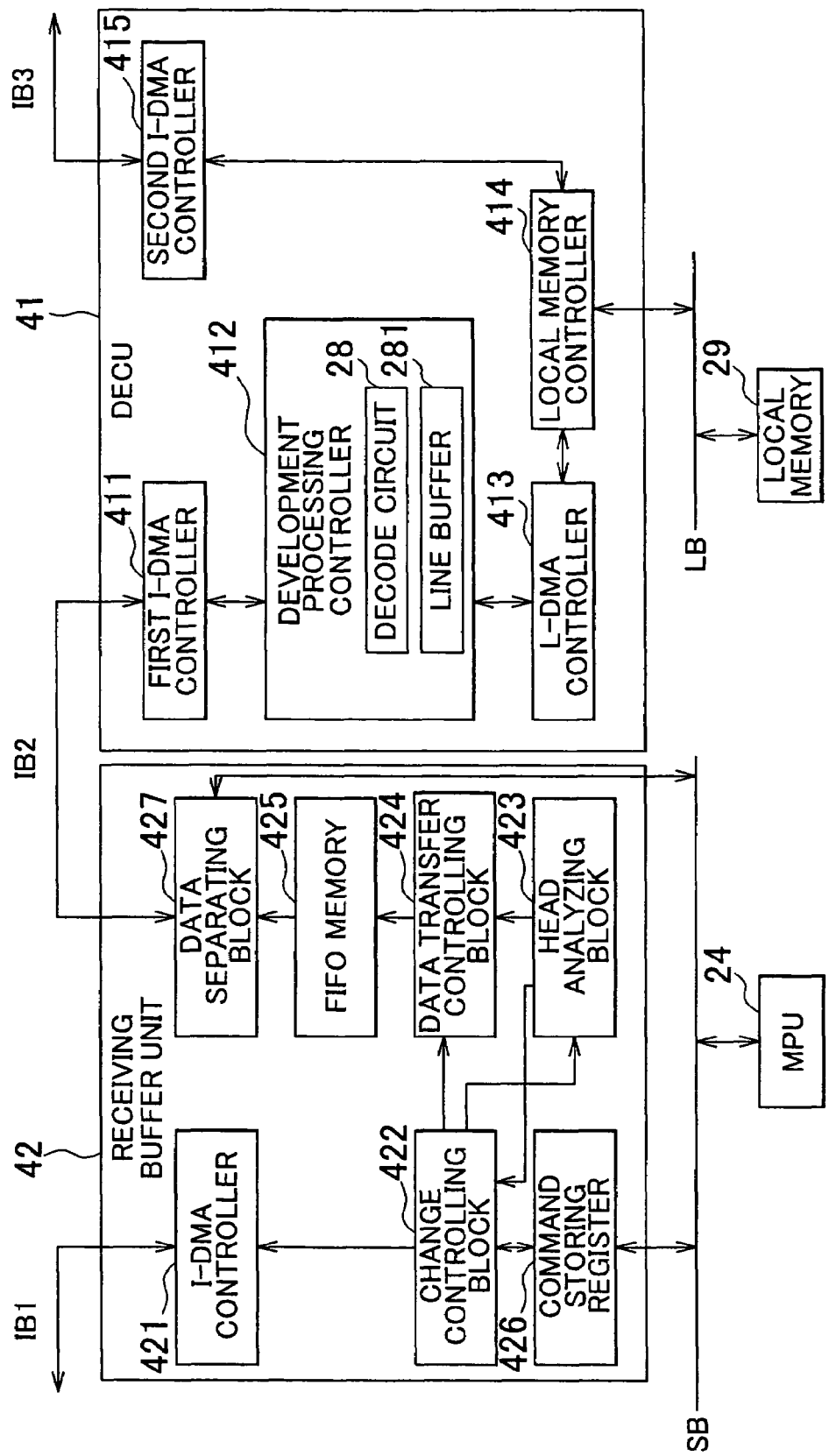
FIG. 6 is a block diagram showing the configurations of the DECU and the receiving buffer unit.
Figure 8:
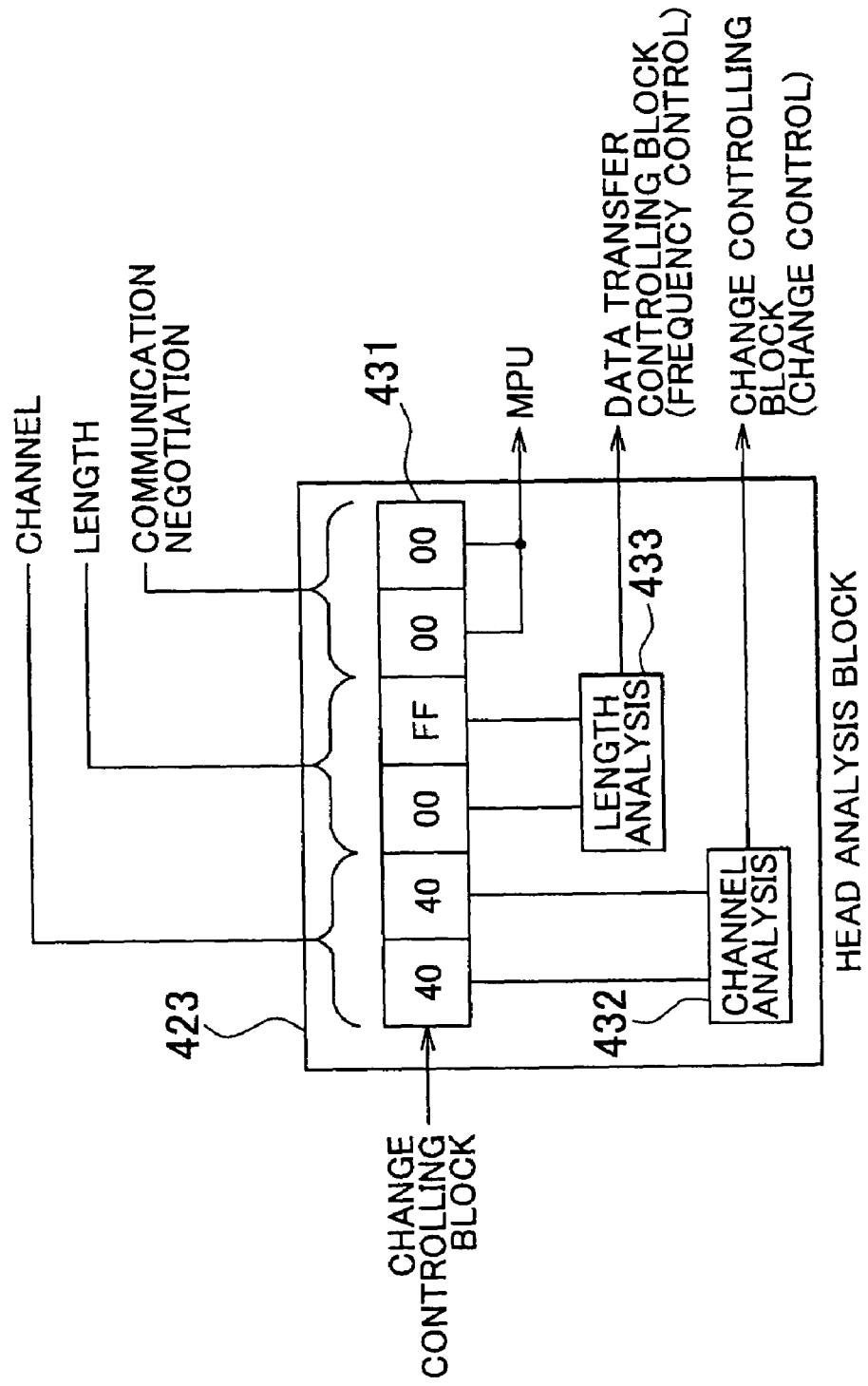
FIG. 8 is a block diagram showing the configuration of the header analyzing block.

FIG. 6 is a block diagram showing the internal configurations of the DECU 41 and the receiving buffer unit 42. FIG. 8 shows the configuration of a header analysis block of the receiving buffer unit 42. And, the DECU 41 and the receiving buffer unit 42 configured in the ASIC 4 will be described in further detail.

The receiving buffer unit 42 has a FIFO (First In First Out) memory 425 as a "main memory" in which the compressed recording data is stored, a data transfer controlling block 424 as a "data transfer controlling means" for storing the compressed recording data in the FIFO memory 425, a command storing register 426 in which the command is stored, a header analyzing block 423 as a "header analyzing means" for analyzing the header of the record controlling data, a change controlling block 422 as a "command separating means" for separating the command from the record controlling data based on the analysis result of the header analyzing block 423, storing the command in the command storing register 426, transferring the record controlling data after command separation to the data transfer controlling block 424 and storing it in the FIFO memory 425 and a data separating block 427 as a "data separating means" for separating the record controlling data stored in the FIFO memory 425 into the remote command and the compressed recording data. In addition, the receiving buffer unit 42 has an I-DMA controller 421 for controlling DMA transfer performed via the first dedicated bus IB1 with the interface unit 27.

When the transfer of the record controlling data between the information processing apparatus 200 and the ink-jet type recording apparatus 50 is started, the record controlling data received by the interface unit 27 is DMA-transferred to the receiving buffer unit 42 via the first dedicated bus IB1. The record controlling data DMA-transferred to the received buffer unit 42 is transferred to the change controlling block 422 which changes the data transfer route of the record controlling data inside the receiving buffer unit 42. The change controlling block 422 is a block for transferring the record controlling data DMA-transferred from the interface unit 27 to one of the header analyzing block 423, the data transfer controlling block 424 and the command storing register 426, and this data transfer route is controlled by the header controlling block 423. At the data transfer start, the data transfer route of the change controlling block 422 is toward the header analyzing block 423, and first the header analysis is performed in the header analyzing block 423.

In regard to the data communication format according to the present invention, a header of 6 bytes is added to the record controlling data, and the header is stored in a 6 bytes register 431 to be analyzed. In regard to the configuration of the header, the first two bytes are a channel, the next two bytes are a length and the next two bytes are the data which is used for negotiation of data communication in order that the interface unit 27 can confirm and determine communication conditions or communication protocol about hardware with the information processing apparatus 200. The channel indicates whether the data following the header is the command or the compressed recording data, and the data from 00H or 02H is the command and the data from 40H is the remote command and the compressed recording data. The upper byte indicates receiving while the lower byte indicates sending. The length is the amount (bytes) of the data included in the header. The command is such controlling command as feeding control, carriage control and discharge control of the recording papers and drive control of the carriage 61 in order to perform recording control in regard to the inkjet type recording apparatus 50.

The header analyzing block 423, in case the data following the header is the command after the channel analyzing block 432 analyzes the header of first two bytes, changes the data transfer route of the change controlling block 422 to the command storing register 426 and stores the data of some bytes which have been analyzed by the length analyzing block 433 into the command storing register 426. In addition, in case the data following the header is the remote command and the compressed recording data after the channel analyzing block 432 analyzes the header of first two bytes, the header analyzing block 423 changes the data transfer route of the change controlling block 422 to the data transfer controlling block 424, informs the data transfer controlling block 424 of the number of bytes which have been analyzed and transfers the data of those bytes into the data transfer controlling block 424. For example, when the data shown in FIG. 8 is stored in the header, the channel is 40 H while the length is FFH, and thus the remote command and the compressed recording data are 255 bytes including the header, that is, the remote command and the compressed recording data following the header are 249 bytes, and therefore the data of 249 bytes following the header is transferred to the data transfer controlling block 424.

In regard to the command stored in the command storing register 426, the MPU 24 accesses it via the system bus SB to perform command analysis. The remote command and the compressed recording data transferred to the data transfer controlling block 424 are stored in the FIFO memory 425. The remote command and the compressed recording data stored in the FIFO memory 425 are DMA-transferred to the DECU 41 via the second dedicated bus IB2 responding to the data transfer request from the DECU 41. At this time, if the data observed by the MPU 24 is the remote command in regard to the data separating block 427, the MPU 24 performs command analysis on the remote command not to transfer it to the DECU 41, and only the compressed recording data is DMA-transferred to the DECU 41. Further, if the data communication format between the information processing apparatus 200 and the interface unit 27 is the data communication format without a header, the header analysis in not performed in the header analyzing block 423, and after the data received by the interface unit 27 is stored in the FIFO memory 425 as it is, the data from which the remote command is separated then the MPU 24 performs remote command analysis.

The DECU 41 has a first I-DMA controller 411, a second I-DMA controller 415 and an L-DMA controller 413 as the "DMA-transferring means". The first I-DMA controller 411 for controlling DMA transfer through the second dedicated bus IB2 DMA-transfers the compressed recording data stored in the FIFO memory 425 of the receiving buffer unit 42 to a development processing controller 412 one word each. The development processing controller 412 includes the decode circuit 28 and the line buffer 281. The compressed recording data DMA-transferred one word each from the FIFO memory 425 of the receiving buffer unit 42 is hardware-developed by the decode circuit 28 one word each, and the developed recording data is stored and accumulated in the line buffer 281.

The L-DMA controller 413 controls DMA transfer through the local bus LB. In addition, a local memory controller 414 controls retrieving and writing data in regard to the local memory 29 coupled to the local bus LB. And, when developed recording data of predetermined bytes has been accumulated in the line buffer 281, it is DMA-transferred to the local memory 29 through the local bus LB via the local memory controller 414 by the L-DMA controller 413 as not synchronized with the DMA transfer through the system bus SB. The recording data developed and DMA-transferred to the local memory 29 is stored in the predetermined bitmap area of the local memory 29. The second I-DMA controller 415 controls DMA transfer through the third dedicated bus IB3. The developed recording data stored in the bitmap area of the local memory 29 is DMA-transferred to the head controlling unit 33 through the local bus LB and the third dedicated bus IB3 via the local memory controller 414 by the second I-DMA controller 415, then stored in a register in the head controlling unit 33 and then DMA-transferred to the recording head 62.

In addition, the DMA transfer from the line buffer 281 to the local memory 29 is transfer in burst by the L-DMA controller 413, and the DMA transfer from the local memory 29 to the recording head 62 is transfer in burst by the second I-DMA controller 415. As described above, the burst transfer is such data transfer method as, when the continuous data is transferred, the data is transferred occupying a bus until all data of a predetermined data block is completely transferred by omitting a part of a sequence such as an address designation. The L-DMA controller 413, when the developed recording data of predetermined bytes has been accumulated in the line buffer 281, transfers in burst the developed recording data of predetermined bytes one word each, occupying the local bus LB until the data of predetermined bytes is completely DMA-transferred to the local memory 29. The second I-DMA controller 415 transfers in burst the developed recording data stored in the bitmap area of the local memory 29 one word per a data block of predetermined bytes, occupying the local bus LB until all of one data block has been completely DMA-transferred to the recording head 62.

And, in case the burst transfer from the line buffer 281 to the local memory 29 and the burst transfer from the local memory 29 to the recording head 62 compete each other, the burst transfer from the local memory 29 to the recording head 62 has priority, and thus during the burst transfer from the local memory 29 to the recording head 62 the burst transfer from the line buffer 281 to the local memory 29 is temporarily stopped, so that the ink ejecting operation from the nozzle arrays of the recording head 62 based on the recording data from the local memory 29 to the recording head 62 is not interrupted. By transferring data while occupying the local bus LB until all data of a predetermined data block is completely sent in regard to the recording head 62, such problem as data transfer by the request of the MPU 24 through the system bus SB cannot be performed does not occur, and thus it is possible to perform data transfer of recording data to the recording head 62 at high speed.

Figure 9:
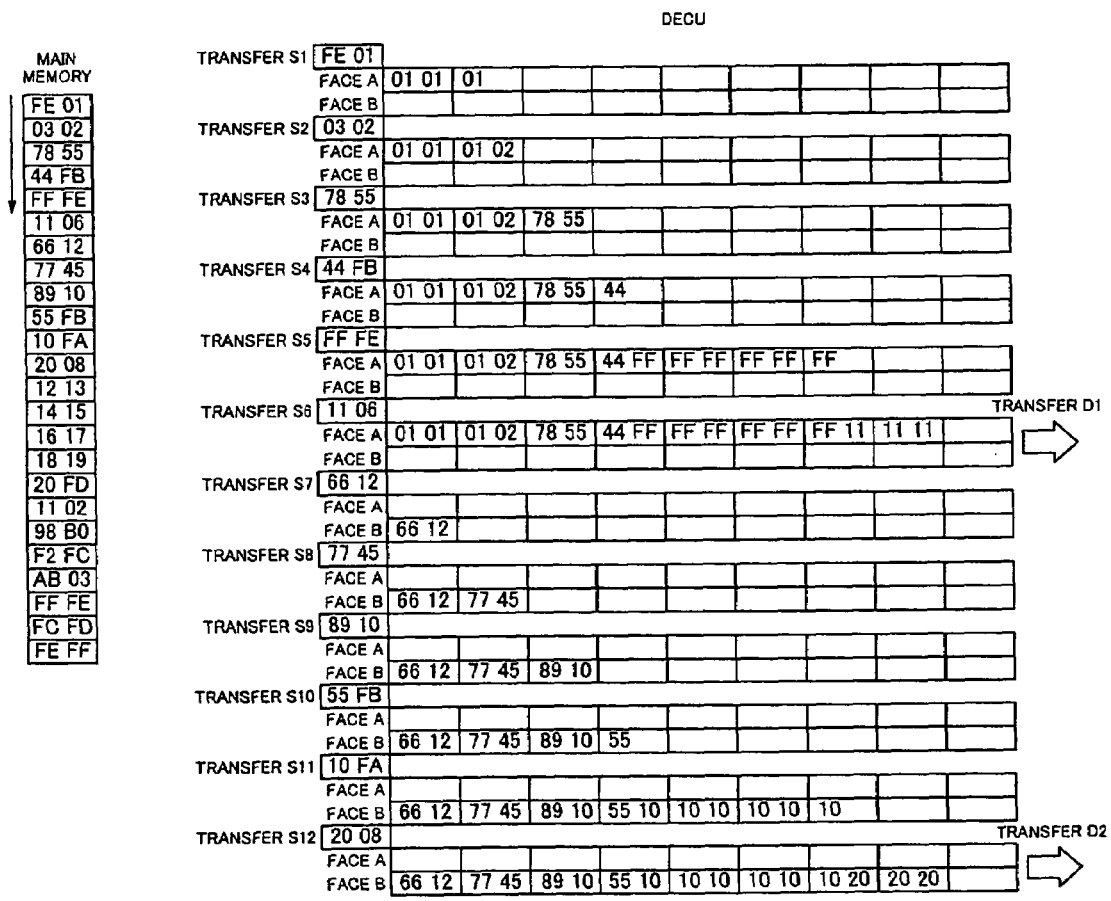
FIG. 9 is a diagram showing such flow as compressed recording data is developed.
Figure 12:
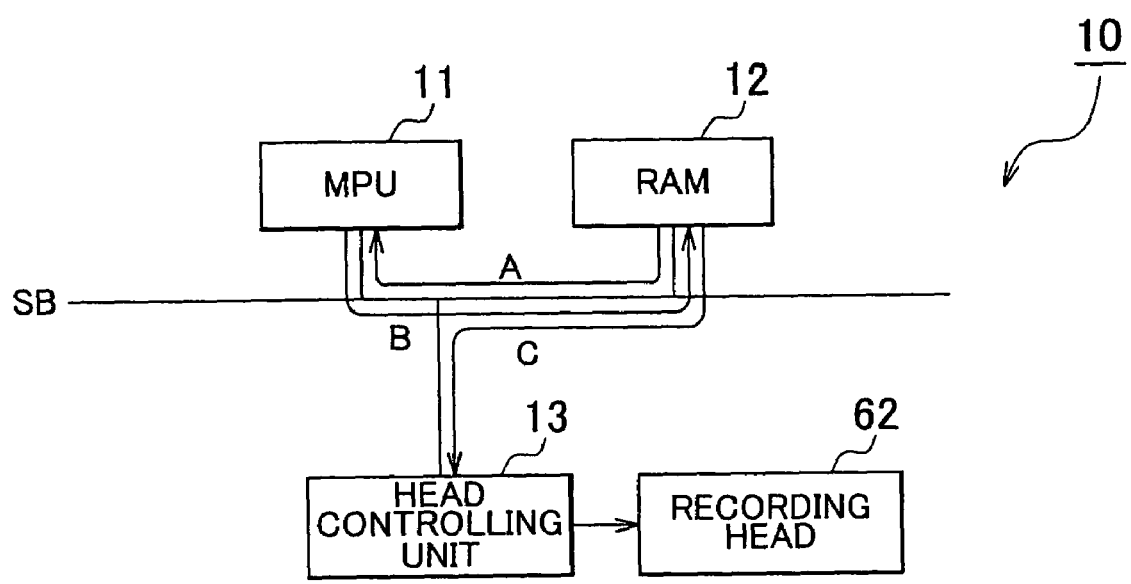
FIG. 12 is a block diagram showing a data transferring apparatus in regard to the prior art.

FIG. 9 and FIG. 10 are diagrams schematically showing the state until compressed recording data is hardware-developed in the decoded circuit 28 and stored in the line buffer 281 in the DECU 41. In addition, FIG. 11 is a diagram schematically showing the state until the developed recording data is transferred and stored from the line buffer 281 to the local memory 29.

In this embodiment, the compressed recording data has been compressed by a run length compression method. The run length compression method is a well-known data compression method and it will be briefly described below. The run length compressed data is compressed data of byte boundary, and has a set of count (1 byte) and data (1 byte or bytes). In other words, the run length compressed data is configured to first have the count and then necessarily have the data. If the value of the count is more than 128 (a negative constant), that is, more than 80H, that means repeatedly developing the next data of 1 byte, and thus the data of 1 byte following the count is repeatedly developed as many times as 257 from which the value of the count subtracted. On the other hand, if the value of the count is less than 127, that is, less than 7FH, that means continuing data to be developed as it is without repeating after the count, and thus the data following the count is developed as it is without repetition as many times as the value of the count to which one is added.

Next, the configuration of the line buffer 281 will be described. The line buffer 281 has two faces of data storing areas of 9 words that combine storing areas of 8 words (16 bytes) and preliminary storing areas of 1 word (2 bytes), and each of faces is A face and B face respectively. The recording data developed by the decode circuit 28 one word each is stored in one of the A face and the B face of the line buffer 281 one word each in turn, and the data is turned to be stored into the other face after the developed data has been accumulated to be a predetermined amount, in the present embodiment, 16 bytes. In addition, the accumulated and developed data of 16 bytes, as described above, is stored in a predetermined bitmap area of the local memory 29. In this way, the line buffer 281 has two faces of buffer areas which are capable of storing the recording data after development of 16 bytes, and stores the recording data which has been developed by the decode circuit 28 in a first face of the buffer areas. And, after 16 bytes have been accumulated, while the developed recording data of the first face is transferred per word unit by a DMA transferring means, the recording data developed by the decoded circuit 28 can be stored in a second face of the buffer areas, so that it is possible to perform development process of compressed recording data and data transfer process in parallel.

Continuously, run length compressed data taken for example, the flow of recording data will be described, wherein the compressed data is developed by the decode circuit 28, stored in the line buffer 281 and stored from the line buffer 281 to the local memory 29.

In the FIFO memory 425 (main memory) of the receiving buffer unit 42, the run length compressed recording data of 24 words (48 bytes) which begins from FEH is stored. The run length compressed recording data is DMA-transferred to the decode circuit 28 via the second dedicated bus IB2 one word each, namely, two bytes each, hardware-developed and stored in the line buffer 281. In the present embodiment, the data starting address of the run length compressed data is an even address, and the data starting address of the bitmap data (image data) in the local memory 29 is an even address. And, the number of bytes of the data block DMA-transferred from the line buffer 281 to the local memory 29 (the number of bytes of 1 line) is 16 bytes. Further, in the main memory, the line buffer 281 in the DECU 41 shown in FIG. 9 and the local memory 29 shown in FIG. 11, the left top is an even address, and addresses gets to be upper addresses in order from the left to the right.

Hereinafter, one word each will be described in order. First, the compressed recording data of initial 1 word (FEH, 01H) DMA-transferred from the FIFO memory 425 of the receiving buffer unit 42 to the decode circuit 28 in the DECU 41 (Transfer S1). The FEH is the count, and the 01H is the data. Since the value of the count of FEH is 254, that is, larger than 128 and 257−254=3 times, the data of 01H is repeatedly developed and 1 byte each is stored in order in the A face of the line buffer 281. Next, the run length compressed data DMA-transferred to the decode circuit 28 is 03H and 02H (Transfer S2). The 03H is the count, and the 02H is the data. Since the value of the count of 03H is 3, that is, smaller than 127 and 3+1=4 bytes, the data following the count gets developed without repletion. That is, the data of 02H, 78H, 55H and 44H following the count 03H is developed as it is without repetition, and stored in order in the A face of the line buffer 281 (Transfers S2 to S4). The FBH which is the upper part (odd address part) of the DMA-transferred word data in the Transfer S4 is the count, and the next data of 1 byte is repeatedly developed 6 times (257−251=6).

Continuously, the compressed recording data DMA-transferred from the FIFO memory 425 to the decode circuit 28 is FFH and FEH (Transfer S5). The lower address (even address) of FFH is the data, besides the data of the previous count of FBH. Therefore, FFH is repeatedly developed 6 times, and stored in order in the A face of the line buffer 281. And, the upper address (odd address) of FEH is the count, and the next data of 1 byte is repeatedly developed 3 times (257−254=3). Continuously, the compressed recording data DMA-transferred from the FIFO memory 425 to the decode circuit 28 is 11H and 06H (Transfer S6). The lower address (even address) of 11H is the data, besides the data of the previous count of FEH. Therefore, 11H is repeatedly developed 3 times, and stored in the A face of the line buffer 281. And, the upper address (odd address) of 06H is the count, and the next data (66H, 12H, 77H, 45H, 89H, 10H and 55H) of 7 bytes (6+1=7) is developed as it is without repetition, and stored in order in the B face of the line buffer 281 (Transfers S7 to S10).

Figures 11A, 11B, 11C, 11D:
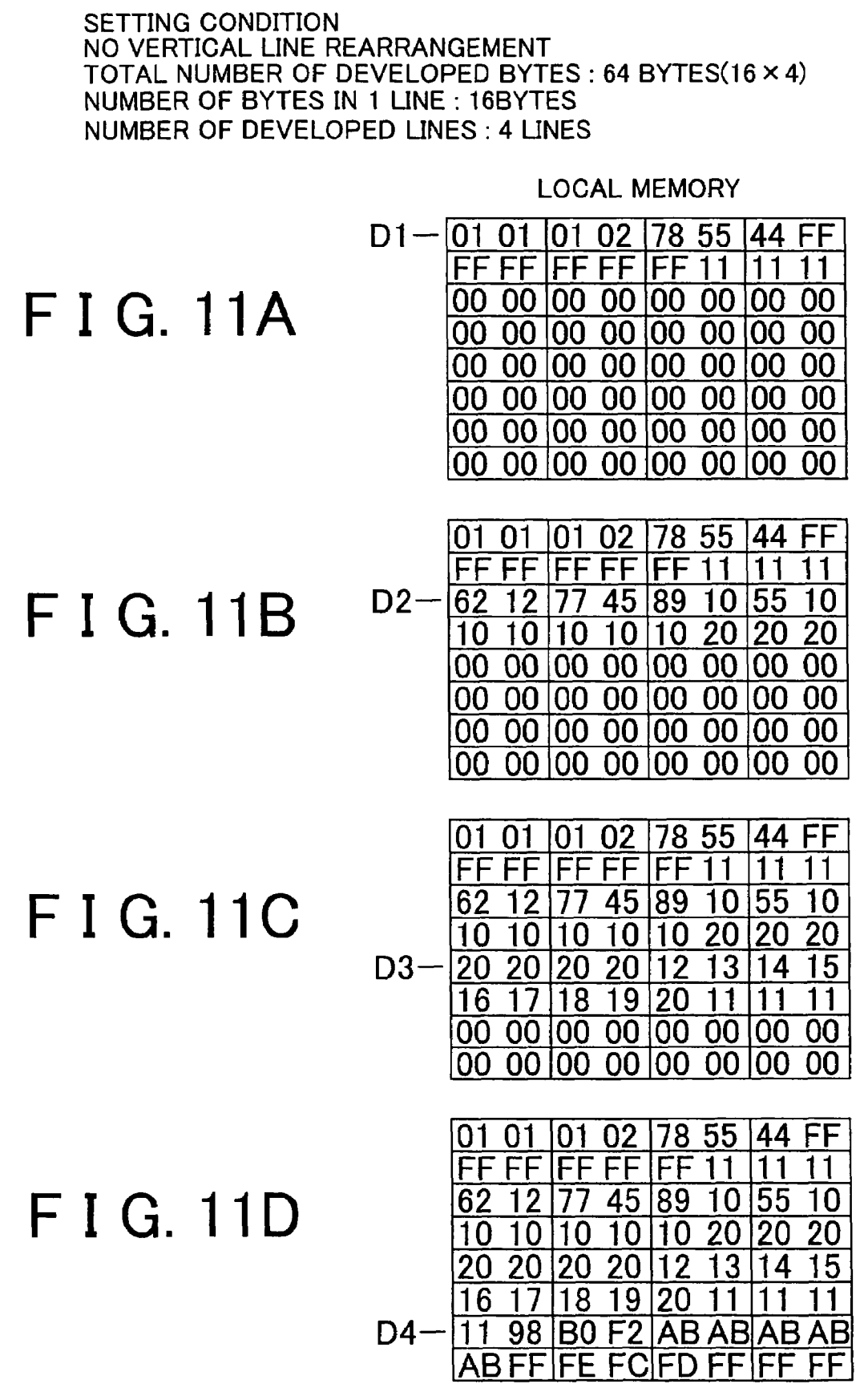

In the mean time, the development processing controller 412, when the developed recording data has been accumulated to be the number of bytes of 1 line in the A face of the line buffer 281, namely, 16 bytes (at the Transfer S6), DMA-transfers the 16 bytes to the local memory 29 one word each as a data block of the 1 line. At that time, the L-DMA controller 413 transfers data in burst, occupying the local bus LB until all the recording data after 1 line development is completely DMA-transferred to the local memory 29 (Transfer D1). The recording data of 1 line transferred to the local memory 29 is stored 1 word each in order in the predetermined bitmap area of the local memory 29 at the first of the even address from the lower address (FIG. 11A).

Continuously, the compressed recording data DMA-transferred from the FIFO memory 425 to the decode circuit 28 is 10H and FAH (Transfer S1). The lower address (even address) of 10H is the data, besides the data of the previous count of FBH. Therefore, 10H is repeatedly developed 6 times, and stored in order in the B face of the line buffer 281. And, the upper address (odd address) of FAH is the count, and the next data of 1 byte is repeatedly developed 7 times (257−250=7). Continuously, the compressed recording data DMA-transferred from the FIFO memory 425 to the decode circuit 28 is 20H and 08H (Transfer S12). The lower address (even address) of 20H is the data, besides the data of the previous count of FAH. Therefore, 20H is repeatedly developed 7 times, and stored in the B face of the line buffer 281, and when the accumulated data in the B face has reached 16 bytes the remaining data gets stored in order in the A face. And, the upper address (odd address) of 08H is the count, and the next data (12H, 13H, 14H, 15H, 16H, 17H, 18H, 19H and 20H) of 9 bytes (8+1=9) is developed as it is without repetition, and stored in order in the A face of the line buffer 281 (Transfers S13 to S17 in FIG. 10).

In the mean time, the development processing controller 412, when the developed recording data has been accumulated to be the number of bytes of 1 line in the B face of the line buffer 281, namely, 16 bytes (at the Transfer S12), DMA-transfers the 16 bytes to the local memory 29 one word each as a data block of the 1 line. At that time, the L-DMA controller 413 transfers data in burst, occupying the local bus LB until all the recording data after 1 line development is completely DMA-transferred to the local memory 29 (Transfer D2). The recording data of 1 line transferred to the local memory 29 is stored 1 word each in order in the predetermined bitmap area of the local memory 29 at the first of the even address from the lower address (FIG. 11B).

Continuously, the compressed recording data DMA-transferred from the FIFO memory 425 to the decode circuit 28 is 11H and 02H (Transfer S18). The lower address (even address) of 11H is the data, besides the data of the previous count of FDH. Therefore, 11H is repeatedly developed 3 times (257−254=3), and stored in the A face of the line buffer 281, and when the accumulated data in the A face has reached 16 bytes the remaining data gets stored in order in the B face. And, the upper address (odd address) of 02H is the count, and the next data (98H, B0H and F2H) of 3 bytes (2+1=3) is developed as it is without repetition, and stored in order in the B face of the line buffer 281 (Transfers S19 to S20).

In the mean time, the development processing controller 412, when the developed recording data has been accumulated to be the number of bytes of 1 line in the A face of the line buffer 281, namely, 16 bytes (at the Transfer S18), DMA-transfers the 16 bytes to the local memory 29 one word each as a data block of the 1 line. At that time, the L-DMA controller 413 (FIG. 6) transfers data in burst, occupying the local bus LB until all the recording data after 1 line development is completely DMA-transferred to the local memory 29 (Transfer D3). The recording data of 1 line transferred to the local memory 29 is stored 1 word each in order in the predetermined bitmap area of the local memory 29 at the first of the even address from the lower address (FIG. 1C).

Continuously, the compressed recording data DMA-transferred from the FIFO memory 425 to the decode circuit 28 is ABH and 03H (Transfer S21). The lower address (even address) of ABH is the data, besides the data of the previous count of FCH (the upper address of the Transfer S20). Therefore, ABH is repeatedly developed 5 times (257−252=5), and stored in order in the B face of the line buffer 281. And, the upper address (odd address) of 03H is the count, and the next data (FFH, FEH, FCH and FDH) of 4 bytes (3+1=4) is developed as it is without repetition, and stored in order in the B face of the line buffer 281 (Transfers S22 to S23).

Continuously, the compressed recording data DMA-transferred from the FIFO memory 425 to the decode circuit 28 is FEH and FFH (Transfer S24). The lower address (even address) of FEH is the data, besides the data of the count of FEH. Therefore, FFH is repeatedly developed 3 times (257−254=3), and stored in order in the B face of the line buffer 281. The development processing controller 412, when the developed recording data has been accumulated to be the number of bytes of 1 line in the B face of the line buffer 281, namely, 16 bytes (at the Transfer S24), DMA-transfers the 16 bytes to the local memory 29 one word each as a data block of the 1 line. At that time, the L-DMA controller 413 transfers data in burst, occupying the local bus LB until all the recording data after 1 line development is completely DMA-transferred to the local memory 29 (Transfer D4).

The recording data of 1 line transferred to the local memory 29 is stored 1 word each in order in the predetermined bitmap area of the local memory 29 at the first of the even address from the lower address (FIG. 11D). And, when the recording data of the bitmap data for ejecting ink with one main scanning pass has been stored in the local memory 29, data is DMA-transferred from the local memory 29 to the recording head 62. At this time, the second I-DMA controller 415 transfers data in burst, occupying the local bus LB until all the recording data of the bitmap data for ejecting ink with one main scanning pass is completely DMA-transferred to the head controlling unit 33.

In this way, it is possible to perform the development process of the compressed recording data at high speed by hardware-developing the compressed recording data, which used to be software-developed by the conventional program, in the decode circuit 28. In addition, since the compressed recording data, which used to be developed one byte each by the conventional program, is developed per word unit (two bytes), it is possible to perform the development process of the compressed recording data at high speed. And, by the configuration to have two independent buses, namely, the system bus SB and the local bus LB and the local memory 29 which is coupled to the local bus LB, it is possible to perform the data transfer to the from the local memory 29 to the recording head 62 through the local bus LB not synchronized with the system bus SB. Owing to this, it is prevented that the data transfer to the recording head 62 gets interrupted by the access from the MPU 24 to the RAM 22 so that the recording performance speed gets low because the data transfer delay of recording data occurs. Further, higher data transfer can be achieved by the DMA transfer.

Further, the header analysis process of the record controlling data on which the conventional program performs software process and the processes storing the command into the command storing register 426 and storing the compressed recording data into the FIFO memory 425 by separating the command from the record controlling data based on the header analysis result are performed in the receiving buffer unit 42. And, the record controlling data received by the interface unit 27 via the first dedicated bus IB1 is transferred to the receiving buffer unit 42, and the record controlling data stored in the FIFO memory 425 of the receiving buffer unit 42 is separated into the remote command and the compressed recording data. And, only the compressed recording data is transferred to the DECU 41, and the recording data developed by the decode circuit 28 is transferred to the head controlling unit 33 via the third dedicate bus IB3. The command and the remote command are analyzed in the MPU 24. Owing to this, since the data transfer load of the system bus and the processing load of the MPU 24 can be significantly reduced, data transfer can be performed while the dependence on the MPU 24 is considerably low, and thus the data transfer processes between the interface unit 27 and the receiving buffer unit 42, between the receiving buffer unit 27 and the DECU 41 and between the DECU 41 and recording head 62 can be performed at higher speed.

Therefore, since it is possible to realize the development process of the compressed data at high speed and the data transfer to the recording head 62 at high speed, it is possible to increase the liquid ejection speed of the inkjet type recording apparatus 50 considerably compared with that of the prior art. By the way, the data transfer speed to the recording head 62, which was 1 Mbytes/sec in the prior art, can be high up to 10 to 11 Mbytes/sec by the data transferring apparatus 10 relating to the present invention. Further, if the data processing capacity of the recording head 62 is low, no matter how fast the data transfer is performed, only the recording performance speed corresponding to the data processing capacity of the recording head 62 is obtained, and thus it is surely necessary to provide a recording head 62 which has enough process speed.

Next, as another embodiment, in regard to the first embodiment described above, the "header analyzing means" and the command separating means" used to be provided in the receiving buffer unit 42 are provided in the interface unit 27.

Figure 7:
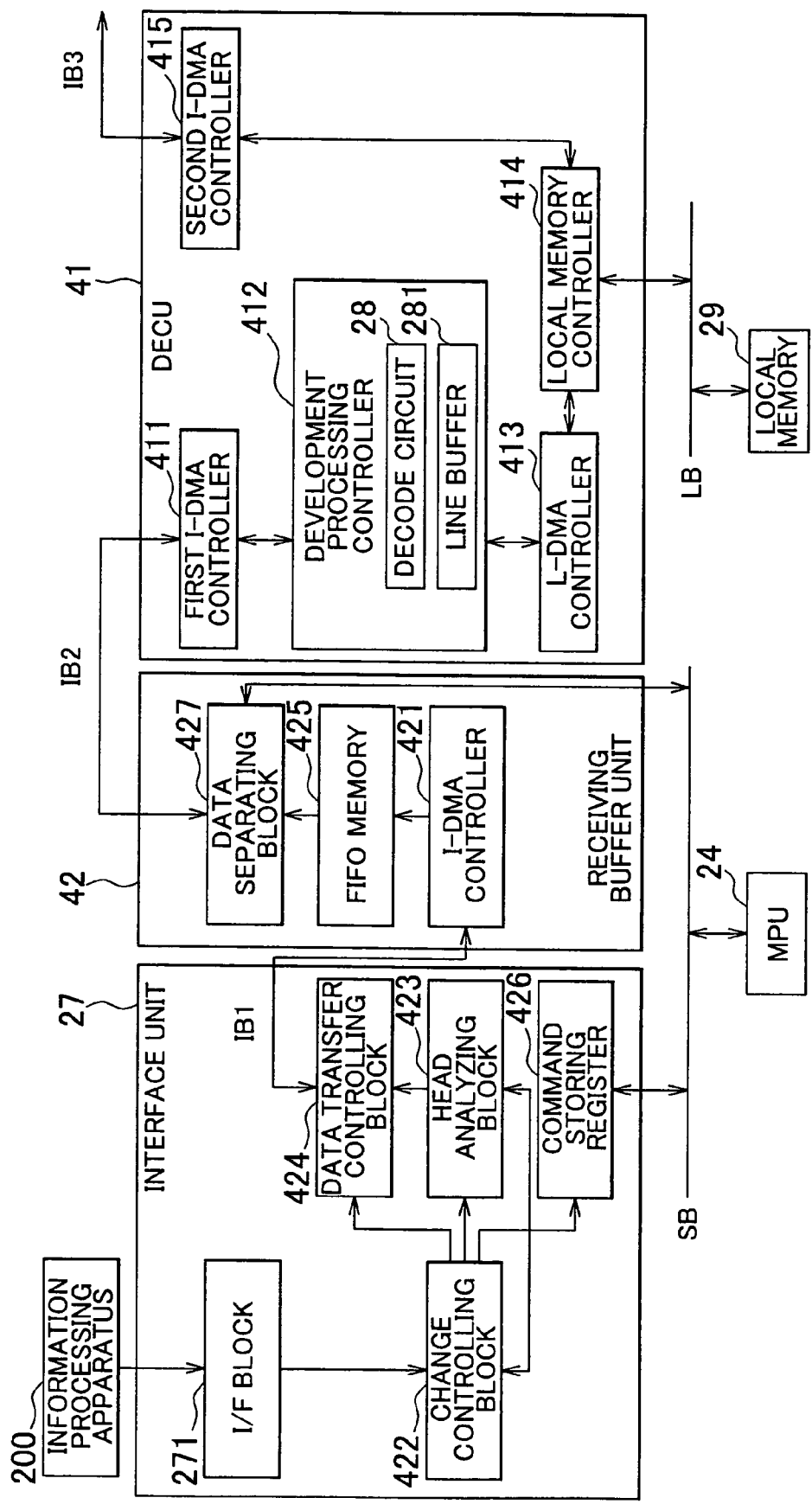
FIG. 7 is a block diagram showing the configuration of the interface unit.

FIG. 7 is a block diagram showing the internal configurations of the DECU 41, the receiving buffer unit 42 and the interface unit 27.

The interface unit 27 has an I/F block 271 as a means for sending and receiving data to and from the information processing apparatus 200 taking the information processing apparatus 200 as a host apparatus in a predetermined data transfer sequence, a command storing register 426 in which the command is stored, a header analyzing block 423 as a "header analyzing means" for analyzing the header of the record controlling data, a change controlling block 422 as a "command separating means" for separating the command from the record controlling data based on the analysis result of the header analyzing block 423, storing the command in the command storing register 426, transferring the record controlling data after command separation to the data transfer controlling block 424 and storing it in the FIFO memory 425 and a data transfer controlling block 424 as a "data transfer controlling means" for storing the compressed recording data in the FIFO memory 425. In addition, the receiving unit 42 has an I-DMA controller 421 for controlling DMA transfer performed via the first dedicated bus IB1 with the interface unit 27, a FIFO (First In First Out) memory 425 as a "main memory" in which the compressed recording data is stored and a data separating block 427 as a "data separating means" for separating the record controlling data stored in the FIFO memory 425 into the remote command and the compressed recording data.

When the transfer of the record controlling data between the information processing apparatus 200 and the ink-jet type recording apparatus 50 is started, the record controlling data received by the I/F block 271 is DMA-transferred to the change controlling block 422 which changes the data transfer route of the record controlling data inside the interface unit 27. The change controlling block 422 is a block for transferring the record controlling data received by the I/F block 271 to one of the header analyzing block 423, the data transfer controlling block 424 and the command storing register 426, and this data transfer route is controlled by the header controlling block 423. At the data transfer start, the data transfer route of the change controlling block 422 is toward the header analyzing block 423, and first the header analysis is performed in the header analyzing block 423.

The header analyzing block 423, in case the data following the header is the command after the channel analyzing block 432 analyzes the header of first two bytes, changes the data transfer route of the change controlling block 422 to the command storing register 426 and stores the data of some bytes which have been analyzed by the length analyzing block 433 into the command storing register 426. In addition, in case the data following the header is the remote command and the compressed recording data after the channel analyzing block 432 analyzes the header of first two bytes, the header analyzing block 423 changes the data transfer route of the change controlling block 422 to the data transfer controlling block 424, informs the data transfer controlling block 424 of the number of bytes which have been analyzed and transfers the data of those bytes into the data transfer controlling block 424. For example, when the data shown in FIG. 8 is stored in the header, the channel is 40H while the length is FFH, and thus the remote command and the compressed recording data are 255 bytes including the header, that is, the remote command and the compressed recording data following the header are 249 bytes, and therefore the data of 249 bytes following the header is transferred to the data transfer controlling block 424.

In regard to the command stored in the command storing register 426, the MPU 24 accesses it via the system bus SB to perform command analysis. The remote command and the compressed recording data transferred to the data transfer controlling block 424 are DMA-transferred to the receiving buffer unit 42 by the I-DMA controller 421 of the receiving buffer unit 42 via the first dedicated bus IB1 and are stored in the FIFO memory 425. The remote command and the compressed recording data stored in the FIFO memory 425 are DMA-transferred to the DECU 41 via the second dedicated bus IB2 responding to the data transfer request from the DECU 41. At this time, if the data observed by the MPU 24 is the remote command in regard to the data separating block 427, the MPU 24 performs command analysis on the remote command not to transfer it to the DECU 41, and only the compressed recording data is DMA-transferred to the DECU 41. Further, if the data communication format between the information processing apparatus 200 and the interface unit 27 is the data communication format without a header, the header analysis in not performed in the header analyzing block 423, and after the data received by the interface unit 27 is stored in the FIFO memory 425 as it is, the data from which the remote command is separated then the MPU 24 performs remote command analysis.

The compressed recording data stored in the FIFO memory 425 of the received buffer unit 42 is DMA-transferred to the development processing controller 412 of the DECU 41 one word each by the first I-DMA controller 411 which controls the DMA transfer through the second dedicated bus IB2. The compressed recording data DMA-transferred from the FIFO memory 425 of the received buffer unit 42 is hardware-developed by the decode circuit 28 one word each, and the developed recording data is stored and accumulated in the line buffer 281. When the developed recording data of predetermined bytes has been accumulated in the line buffer 281, it is DMA-transferred to the local memory 29 through the local bus LB via the local memory controller 414 by the L-DMA controller 413 as not synchronized with the DMA transfer through the system bus SB. The recording data developed and DMA-transferred to the local memory 29 is stored in the predetermined bitmap area of the local memory 29. The developed recording data stored in the bitmap area of the local memory 29 is DMA-transferred to the head controlling unit 33 through the local bus LB and the third dedicated bus IB3 via the local memory controller 414 by the second I-DMA controller 415, then stored in a register in the head controlling unit 33 and then DMA-transferred to the recording head 62.

The L-DMA controller 413, when the developed recording data of predetermined bytes has been accumulated in the line buffer 281, transfers in burst the developed recording data of predetermined bytes one word each, occupying the local bus LB until the data of predetermined bytes is completely DMA-transferred to the local memory 29. The second I-DMA controller 415 transfers in burst the developed recording data stored in the bitmap area of the local memory 29 one word per a data block of predetermined bytes, occupying the local bus LB until all of one data block is completely DMA-transferred to the recording head 62. In case the burst transfer from the line buffer 281 to the local memory 29 and the burst transfer from the local memory 29 to the recording head 62 compete each other, the burst transfer from the local memory 29 to the recording head 62 has priority, and thus during the burst transfer from the local memory 29 to the recording head 62 the burst transfer from the line buffer 281 to the local memory 29 is temporarily stopped, so that the ink ejecting operation from the nozzle arrays of the recording head 62 based on the recording data from the local memory 29 to the recording head 62 is not interrupted.

Although the invention has been described in its preferred form with a certain degree of particularity, obviously many changes and variations are possible therein. It is therefore to be understood that the present invention may be practiced than as specifically described herein without departing from scope and the sprit thereof.

What is claimed is:

1. A data transferring apparatus for transferring liquid ejection data, comprising:
   a bus system, which comprises two independent bus systems of a system bus and a local bus;
   a local memory coupled to said local bus in order to be able to transfer data to said local bus;
   an interface unit for receiving liquid ejection controlling data which comprises liquid ejection data compressed to be capable of line development;
   a receiving buffer unit comprising a main memory for storing liquid ejection data compressed to be capable of line development;
   a head controlling unit comprising a register of a liquid ejecting head;
   a decode unit comprising a decode circuit, which can perform hardware development on liquid ejection data compressed to be capable of line development, wherein said decode unit is coupled to said system bus and local bus in order to transfer data therebetween;
   a first dedicated bus for coupling said interface unit to said receiving buffer unit;
   a second dedicated bus for coupling said receiving buffer unit to said decode unit; and
   a third dedicated bus for coupling said decode unit to said head controlling unit,
   wherein said receiving buffer unit comprises:
     a command storing register which is accessible from said system bus,
     a header analyzing unit for analyzing a header of said liquid ejection controlling data,
     a command separating unit for separating a command from said liquid ejection controlling data according to an analysis result of said header analyzing unit and storing said command into said command storing register, and
     a data transfer controlling unit for storing liquid ejection controlling data, from which said command is separated, into said main memory.

2. A data transferring apparatus as claimed in claim 1, wherein
   said receiving buffer unit further comprises a data separating unit for separating said liquid ejection controlling data stored in said main memory into a remote command and liquid ejection data compressed to be capable of line development,
   said remote command is processed by a microprocessor coupled to said system bus, and
   said liquid ejection data compressed to be capable of line development is transferred to said decode unit.

3. A data transferring apparatus for transferring liquid ejection data, comprising:
   a bus system, which comprises two independent bus systems of a system bus and a local bus;
   transfer data to said local bus;
   an interface unit for receiving liquid ejection controlling data which comprises liquid ejection data compressed to be capable of line development;
   a receiving buffer unit comprising a main memory for storing liquid ejection data compressed to be capable of line development;
   a head controlling unit comprising a register of a liquid ejecting head;
   a decode unit comprising a decode circuit, which can perform hardware development on liquid ejection data compressed to be capable of line development, wherein said decode unit is coupled to said system bus and local bus in order to transfer data therebetween;
   a first dedicated bus for coupling said interface unit to said receiving buffer unit;
   a second dedicated bus for coupling said receiving buffer unit to said decode unit; and
   a third dedicated bus for coupling said decode unit to said head controlling unit,
   wherein said receiving buffer unit comprises:
      data transfer controlling unit for storing liquid ejection controlling data received by said interface unit into said main memory, and
      a data separating unit for separating said liquid ejection controlling data stored in said main memory into a command and liquid ejection data compressed to be capable of line development,
   wherein said command is processed by a microprocessor coupled to said system bus, and
   said liquid ejection data compressed to be capable of line development is transferred to said decode unit.

4. A data transferring apparatus as claimed in claim 3, wherein said decode unit further comprises:
   a line buffer for storing said liquid ejection data developed by said decode circuit by word unit, and
   a DMA transferring unit for performing DMA transfer on said liquid ejection data compressed to be capable of line development to said decode circuit from said main memory, performing DMA transfer on said liquid ejection data developed in said line buffer to said local memory by word unit, and performing sequential DMA transfer on said developed liquid ejection data stored in said local memory to said register of said liquid ejecting head.

5. A data transferring apparatus as claimed in claim 4, wherein said line buffer further comprises two (2) faces of buffer areas for storing developed data of predetermined words, said liquid ejection data developed by said decode circuit is sequentially stored in a first face of said buffer areas, while said liquid ejection data developed by said decode circuit is sequentially stored in a second face of said buffer areas when said developed data of predetermined words is accumulated, and DMA transfer to said local memory is performed per predetermined words with respect to said developed data when said developed data of predetermined words is accumulated.

6. A data transferring apparatus as claimed in claim 5, wherein one (1) ASIC comprises said interface unit, said receiving buffer unit, said decode unit, said head controlling unit and said first, second and third dedicated buses.

7. A data transferring apparatus as claimed in claim 6, wherein said data transfer to said local memory from said decode unit and to said register of said liquid ejecting head from said local memory on said local bus is performed by burst transfer.

8. A data transferring apparatus as claimed in claim 7, wherein said compressed liquid ejection data is run length compression data, and said decode circuit can perform hardware development on run length compression data.

9. A data transferring apparatus as claimed in claim 8, wherein said decode unit further comprises a means for storing uncompressed liquid ejection data, which is DMA-transferred from said main memory, into said line buffer without hardware development by said decode circuit.

10. A liquid ejecting apparatus comprising a data transferring apparatus for transferring liquid ejection data, said data transferring apparatus comprising:
   a bus system, which comprises two independent bus systems of a system bus and a local bus;
   a local memory coupled to said local bus in order to be able to transfer data to said local bus;
   an interface unit for receiving liquid ejection controlling data which comprises liquid ejection data compressed to be capable of line development;
   a receiving buffer unit comprising a main memory for storing liquid ejection data compressed to be capable of line development;
   a head controlling unit comprising a register of a liquid ejecting head;
   a decode unit comprising a decode circuit, which can perform hardware development on liquid ejection data compressed to be capable of line development, wherein said decode unit is coupled to said system bus and local bus in order to transfer data therebetween;
   a first dedicated bus for coupling said interface unit to said receiving buffer unit;
   a second dedicated bus for coupling said receiving buffer unit to said decode unit; and
   a third dedicated bus for coupling said decode unit to said head controlling unit,
   wherein said receiving buffer unit comprises:
      a command storing register which is accessible from said system bus,
      a header analyzing unit for analyzing a header of said liquid ejection controlling data,
      a command separating unit for separating a command from said liquid ejection controlling data according to an analysis result of said header analyzing unit and storing said command into said command storing register, and
      a data transfer controlling unit for storing liquid ejection controlling data, from which said command is separated, into said main memory.

11. A liquid ejecting apparatus comprising a data transferring apparatus for transferring liquid ejection data, said data transferring apparatus comprising:
   a bus system, which comprises two independent bus systems of a system bus and a local bus;
   a local memory coupled to said local bus in order to be able to transfer data to said local bus;
   an interface unit for receiving liquid ejection controlling data which comprises liquid ejection data compressed to be capable of line development;
   a receiving buffer unit comprising a main memory for storing liquid ejection data compressed to be capable of line development;

a head controlling unit comprising a register of a liquid ejecting head;

a decode unit comprising a decode circuit, which can perform hardware development on liquid ejection data compressed to be capable of line development, wherein said decode unit is coupled to said system bus and local bus in order to transfer data therebetween;

a first dedicated bus for coupling said interface unit to said receiving buffer unit;

a second dedicated bus for coupling said receiving buffer unit to said decode unit; and a third dedicated bus for coupling said decode unit to said head controlling unit, wherein said receiving buffer unit comprises:
- a data transfer controlling unit for storing liquid ejection controlling data received by said interface unit into said main memory, and
- a data separating unit for separating said liquid ejection controlling data stored in said main memory into a command and liquid ejection data compressed to be capable of line development, wherein said command is processed by a microprocessor coupled to said system bus, and said liquid ejection data compressed to be capable of line development is transferred to said decode unit.

12. A data transferring apparatus for transferring liquid ejection data, comprising:

a bus system, which comprises two independent bus systems of a system bus and a local bus;

a local memory coupled to said local bus in order to be able to transfer data to said local bus;

an interface unit for receiving liquid ejection controlling data which comprises liquid ejection data compressed to be capable of line development;

a receiving buffer unit comprising a main memory for storing liquid ejection data compressed to be capable of line development;

a head controlling unit comprising a register of a liquid ejecting head;

a decode unit comprising a decode circuit, which can perform hardware development on liquid ejection data compressed to be capable of line development, wherein said decode unit is coupled to said system bus and local bus in order to transfer data therebetween;

a first dedicated bus for coupling said interface unit to said receiving buffer unit;

a second dedicated bus for coupling said receiving buffer unit to said decode unit; and a third dedicated bus for coupling said decode unit to said head controlling unit, wherein said interface unit comprises:
- a command storing register which is accessible from said system bus,
- a header analyzing unit for analyzing a header of said liquid ejection controlling data,
- a command separating unit for separating a command from said liquid ejection controlling data according to an analysis result of said header analyzing unit and storing said command into said command storing register, and
- a data transfer controlling unit for storing liquid ejection controlling data, from which said command is separated, into said main memory.

13. A data transferring apparatus as claimed in claim 12, wherein said receiving buffer unit further comprises a data separating unit for separating said liquid ejection controlling data stored in said main memory into a remote command and liquid ejection data compressed to be capable of line development, said remote command is processed by a microprocessor coupled to said system bus, and said liquid ejection data compressed to be capable of line development is transferred to said decode unit.

14. A data transferring apparatus as claimed in claim 13, wherein said decode unit further comprises:
- a line buffer for storing said liquid ejection data developed by said decode circuit by word unit, and
- a DMA transferring unit for performing DMA transfer on said liquid ejection data compressed to be capable of line development to said decode circuit from said main memory, performing DMA transfer on said liquid ejection data developed in said line buffer to said local memory by word unit, and performing sequential DMA transfer on said developed liquid ejection data stored in said local memory to said register of said liquid ejecting head.

15. A data transferring apparatus as claimed in claim 14, wherein said line buffer further comprises two (2) faces of buffer areas for storing developed data of predetermined words, said liquid ejection data developed by said decode circuit is sequentially stored in a first face of said buffer areas, while said liquid ejection data developed by said decode circuit is sequentially stored in a second face of said buffer areas when said developed data of predetermined words is accumulated, and DMA transfer to said local memory is performed per predetermined words with respect to said developed data when said developed data of predetermined words is accumulated.

16. A data transferring apparatus as claimed in claim 15, wherein one (1) ASIC comprises said interface unit, said receiving buffer unit, said decode unit, said head controlling unit and said first, second and third dedicated buses.

17. A data transferring apparatus as claimed in claim 16, wherein said data transfer to said local memory from said decode unit and to said register of said liquid ejecting head from said local memory on said local bus is performed by burst transfer.

18. A data transferring apparatus as claimed in claim 17, wherein said compressed liquid ejection data is run length compression data, and said decode circuit can perform hardware development on run length compression data.

19. A data transferring apparatus as claimed in claim 18, wherein said decode unit further comprises a means for storing uncompressed liquid ejection data, which is DMA-transferred from said main memory, into said line buffer without hardware development by said decode circuit.

20. A liquid ejecting apparatus comprising a data transferring apparatus for transferring liquid ejection data, said data transferring apparatus comprising:

a bus system, which comprises two independent bus systems of a system bus and a local bus;

a local memory coupled to said local bus in order to be able to transfer data to said local bus;

an interface unit for receiving liquid ejection controlling data which comprises liquid ejection data compressed to be capable of line development;

a receiving buffer unit comprising a main memory for storing liquid ejection data compressed to be capable of line development;

a head controlling unit comprising a register of a liquid ejecting head;

a decode unit comprising a decode circuit, which can perform hardware development on liquid ejection data compressed to be capable of line development, wherein said decode unit is coupled to said system bus and local bus in order to transfer data therebetween;

a first dedicated bus for coupling said interface unit to said receiving buffer unit;

a second dedicated bus for coupling said receiving buffer unit to said decode unit; and a third dedicated bus for coupling said decode unit to said head controlling unit, wherein said interface unit comprises:

a command storing register which is accessible from said system bus, a header analyzing unit for analyzing a header of said liquid ejection controlling data, a command separating unit for separating a command from said liquid ejection controlling data according to said analysis result of said header analyzing unit and storing said command into said command storing register, and a data transfer controlling unit for storing liquid ejection controlling data, from which said command is separated, into said main memory.

\* \* \* \* \*